United States Patent
Hirai

(10) Patent No.: US 7,406,023 B2
(45) Date of Patent: Jul. 29, 2008

(54) OPTICAL REPRODUCTION METHOD, OPTICAL PICKUP DEVICE, OPTICAL REPRODUCTION DEVICE, AND OPTICAL RECORDING MEDIUM

(75) Inventor: Hideaki Hirai, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 606 days.

(21) Appl. No.: 11/138,328

(22) Filed: May 27, 2005

(65) Prior Publication Data

US 2005/0265216 A1  Dec. 1, 2005

(30) Foreign Application Priority Data

May 31, 2004  (JP)  .............. 2004-161132

(51) Int. Cl.
*G11B 7/00* (2006.01)
(52) U.S. Cl. .................... 369/275.3
(58) Field of Classification Search ......... 369/275.1, 369/275.2, 275.3, 275.4, 53.23, 53.22, 112.01
See application file for complete search history.

(56) References Cited

U.S. PATENT DOCUMENTS

| 6,449,232 | B1 * | 9/2002 | Kuwahara et al. ...... 369/53.23 |
| 6,545,958 | B1 | 4/2003 | Hirai et al. |
| 2002/0093902 | A1 | 7/2002 | Hirai |
| 2002/0191502 | A1 | 12/2002 | Hirai |
| 2003/0072247 | A1 | 4/2003 | Hirai |
| 2003/0151999 | A1 | 8/2003 | Hirai et al. |
| 2003/0227859 | A1 | 12/2003 | Hirai |
| 2005/0025026 | A1 | 2/2005 | Hirai |
| 2005/0025028 | A1 | 2/2005 | Hirai et al. |
| 2005/0122879 | A1 | 6/2005 | Hirai et al. |

FOREIGN PATENT DOCUMENTS

| JP | 58-215735 | 12/1983 |
| JP | 07-121881 | 5/1995 |
| JP | 08-096406 | 4/1996 |
| JP | 09-054981 | 2/1997 |
| JP | 2002-157734 | 5/2002 |

OTHER PUBLICATIONS

Hiroshi Ogawa, "Next Generation Optical Disc", pp. 6-7.

* cited by examiner

*Primary Examiner*—Nabil Hindi
(74) *Attorney, Agent, or Firm*—Dickstein Shapiro LLP

(57) ABSTRACT

An optical reproduction method is provided that is able to increase recording capacity of an optical recording medium by combining the techniques of light wavelength reduction, signal level multiplication, and recording layer multiplication in an optical recording medium. In the optical reproduction method for reproducing signals based on light reflected from plural pits in the optical recording medium with plural recording layers, a pit depth H, a wavelength λ of the incident light, and a refractive index n of the substrate of the optical recording medium satisfy: $\lambda/6n \leq H < \lambda/4n$. The region including the pits is divided into cells each having the same area, and multi-level reproduction signals are generated in response to pit occupation of the cells. Spherical aberration $W_{40}$ in light condensed onto the optical recording medium satisfies $W_{40} \leq 0.07 \lambda$rms.

12 Claims, 20 Drawing Sheets

PIT DEPTH 15nm

PIT DEPTH 30nm

PIT DEPTH 40nm

PIT DEPTH 51nm

PIT DEPTH 66nm

PIT DEPTH 80nm

PIT DEPTH 15nm

PIT DEPTH 30nm

PIT DEPTH 40nm

PIT DEPTH 51nm

PIT DEPTH 66nm

PIT DEPTH 80nm

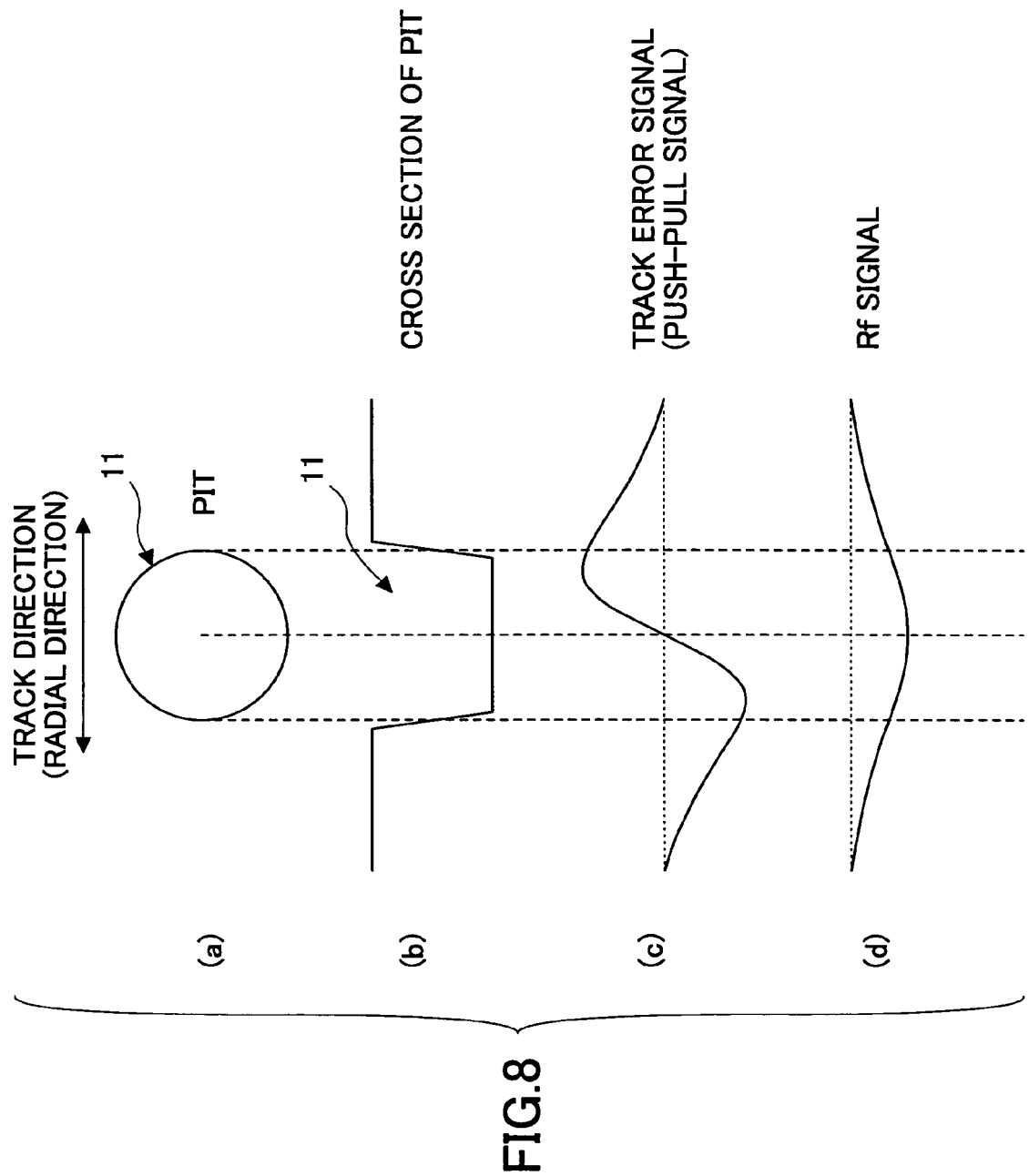

OPTICAL REPRODUCTION METHOD, OPTICAL PICKUP DEVICE, OPTICAL REPRODUCTION DEVICE, AND OPTICAL RECORDING MEDIUM

BACKGROUND OF THE INVENTION

1. Field of the Invention

The present invention relates to an optical reproduction method, an optical pickup device, an optical reproduction device for reproducing data in an optical recording medium, and the optical recording medium.

2. Description of the Related Art

In recent and continuing years, optical recording media, such as a CD having recording capacity of 0.65 GB and a DVD having recording capacity of 4.7 GB, are widely used for storing video data, audio data, and digital data in computers. Presently, it is being required to further increase recording density and the recording capacity of the optical recording media.

In order to increase the recording density of such an optical recording medium, it can be attempted to reduce the wavelength of a light beam incident on the optical recording medium, assign the recording data to multiple levels, or include multiple recording layers in the optical recording medium.

Below, these techniques are described in detail.

Reduction of Light Beam Wavelength

In an optical recording device for recording or reading data in an optical recording medium, by increasing the numerical aperture (NA) of an object lens, or decreasing the wavelength of a light source, it is possible to effectively reduce the diameter of a beam spot formed on the optical recording medium after a light beam is condensed by the object lens.

For example, in a CD-type optical recording medium, the numerical aperture (NA) of the object lens may be set to be 0.50, and the wavelength of the light source may be set to be 780 nm; in contrast, in a DVD-type optical recording medium, the numerical aperture (NA) of the object lens may be set to be 0.65, and the wavelength of the light source may be set to be 660 nm.

As described above, it is desired to further increase the recording density and the recording capacity of the optical recording medium, and for this purpose, it is desired to increase the numerical aperture (NA) of the object lens to be greater than 0.65, or reduce the wavelength of the light source to be shorter than 660 nm. It is known that such a large-capacity optical recording medium and optical recording device can be realized by using a light source operating in the blue-light wavelength region to ensure large recording capacity.

For example, this technique is described in ISOM2001 abstract "Next Generation Optical Disc", Hiroshi Ogawa, pp 6-7 (referred to as "reference 1", hereinafter).

However, if the numerical aperture (NA) of the object lens is increased too much, or the wavelength of the light source is decreased too much, margins of various kinds of variations in the optical recording medium may decline. For example, coma aberration caused by the tilt of the optical recording medium may increase. If the coma aberration occurs, the beam spot formed on the recording surface of the optical recording medium may be degraded, so that normal recording and reproducing operations cannot be performed.

The coma aberration caused by the tilt of the optical recording medium can be expressed by the following formula (1).

$$W_{31} = (n^2-1)/(2n^3) \times (d \times NA^3 \times \theta / \lambda) \quad (1)$$

where $W_{31}$ represents the coma aberration, n represents the refractive index of a transparent substrate of the optical recording medium, d represents the thickness of the transparent substrate, NA represents the numerical aperture (NA) of the object lens, $\lambda$ represents the wavelength of the light source, and $\theta$ represents the tilt of the optical recording medium.

From the formula (1), it is known that the comma aberration ($W_{31}$) increases when the numerical aperture (NA) of the object lens increases and the wavelength of the light source decreases.

Similarly, spherical aberration caused by differences of transparent substrates of the optical recording medium varies in proportion to NA to the power of 4, and $\lambda$ to the power of −1; thus the spherical aberration increases when the numerical aperture (NA) of the object lens increases and the wavelength of the light source decreases.

Multilevel Information

To avoid the above problems, a multi-level recording and reproduction method is proposed in which a signal associated with a pit formed on the optical recording medium is assigned multiple levels. Specifically, in this technique, when a laser beam used for reading an optical recording medium is scanning the optical recording medium, reading data from the optical recording medium is realized by determining variations of the amount of the reflected light from the optical recording medium, with the amount of reflected light depending on presence or absence of pits on the optical recording medium.

In contrast, for example, in the method of multi-level recording and reproduction disclosed in Japanese Laid Open Patent Application No. 58-215735 (referred to as "reference 2", hereinafter), reading data from an optical recording medium is realized by determining variations of the amount of the reflected light from the optical recording medium, with the amount of light depending on a combination of depth and width of each pit on the optical recording medium.

In addition, in the method of multi-level recording and reproduction disclosed in Japanese Laid Open Patent Application No. 7-121881 (referred to as "reference 3", hereinafter), reading data from an optical recording medium is realized by determining variations of the amount of the reflected light from the optical recording medium, with the amount of light depending on a combination of depth, width, and variation of a position shift of each pit on the optical recording medium.

In addition, Japanese Laid Open Patent Application No. 2002-157734 (referred to as "reference 4", hereinafter) discloses a multi-level recording method related to occupation by (presence of) recording marks, in which it is described that when phase pits having depressed and projected shapes are used, optical groove depths of the phase pits are set to be $\lambda/4$ so that a gain of a Rf signal becomes a maximum.

Multi-Layer Recording Layer

Further, it is proposed to form an optical recording medium including plural recording layers. For example, Japanese Laid Open Patent Application No. 8-096406 (referred to as "reference 5", hereinafter) and Japanese Laid Open Patent Application No. 9-054981 (referred to as "reference 6", hereinafter) disclose such an optical recording medium including multiple recording layers.

In the optical recording medium including multiple recording layers, an interval between two recording layers is important. If this interval is too small, because of so-called "interlayer cross-talk", the returning light, which is reflected from the optical recording medium, includes not only light reflected from the object recording layer but also a considerable amount of light reflected from other recording layers. Due to this, the signal-to-noise ratio of the reproduced signals may be degraded. On the other hand, if the interval between two recording layers is too large, because of the spherical aberration, signals associated with light reflected from the object recording layer may be degraded.

For these reasons, in the design of a multi recording layer optical recording medium, for example, in a DVD-ROM having two recording layers on one side thereof, the interval between the two recording layers is defined to be 55±15 μm.

As described above, in order to increase the recording capacity of the optical recording medium, attempts can be made to reduce the wavelength of the recording light beam, or assign multiple levels to recording data, or include multiple recording layers in the optical recording medium. Furthermore, it is expected that the recording capacity can be greatly increased by combining the above techniques.

However, the above techniques and their combinations suffer from the following problems.

First, consider the technique of multi-recording layers in an optical recording medium.

For example, when combining the technique of reducing the wavelength of the recording light beam and the technique of forming multiple recording layers, if the wavelength of the recording light beam is shortened, the upper limit of the interval between two recording layers becomes less than the upper limit of the DVD-ROM having two recording layers on one side thereof (70 μm). For this reason, it is difficult to divert the existing manufacturing equipment, and the fabrication cost of the optical recording media increases.

Next, consider the technique of assigning multiple levels to recording data. It is known that the optical recording media employing the techniques of multi-level signal formation disclosed in reference 2 and reference 3, which are recorded with multi-level data including a pit depth and a pit width, are poor in productivity (low yield).

FIG. 18 is a flowchart illustrating a process for fabricating a read only optical recording medium in the related art, which is recorded with two-level signals (a high level and a low level), as signals reproduced from pits formed on a CD-type or a DVD type recording medium.

As illustrated in FIG. 18, the fabricating process includes a laser cutting step (step S1), a developing step (step S2), a stamper formation step (step S3), and a replication step (step S4).

FIG. 19A through FIG. 19D are cross-sectional views of a read only optical recording medium illustrating the fabrication process of the read only optical recording medium in the related art, as shown in FIG. 18.

As illustrated in FIG. 19A, first, a portion of a resist 102, where a pit is to be formed, on a glass substrate 101 is exposed by a light beam 100 until the glass substrate 101 is reached.

Next, as illustrated in FIG. 19B, developing is performed.

Next, as illustrated in FIG. 19C, based on the developed prototype recording medium, a master stamper is fabricated.

Next, as illustrated in FIG. 19D, using the master stamper, and following a well-known replication process, read only optical recording media 104 are mass-produced. In FIG. 19D, the reference number 105 indicates a pit.

In the above fabrication process of the related art, when adjusting the pit depth, it is necessary to control the exposure of the glass substrate 101, and to form pits having different depths. In this case, however, the bottom is not flat, but is round or is roughened. In addition, because the pit depth is sensitive to the exposure, empirically, it is known that precise control of the pit depth is difficult. Theoretically, the pit depth can be modulated by changing the exposure, but because of the above reasons, in the related art, when fabricating a CD-type read only optical recording medium or a DVD-type read only optical recording medium, exposure is continued until the glass substrate 101 is exposed, and signals corresponding to pit length modulation are recorded in the CD-type or DVD-type read only optical recording medium of the related art.

SUMMARY OF THE INVENTION

Accordingly, it is a general object of the present invention to solve one or more problems of the related art.

A specific object of the present invention is to provide an optical reproduction method able to increase recording capacity of an optical recording medium by combining methods of reducing the wavelength of a recording light beam, assigning multiple levels to recording data, and including plural recording layers in the optical recording medium.

According to a first aspect of the present invention, there is provided an optical reproduction method for reproducing signals based on amount of light reflected from a plurality of pits in an optical recording medium having a plurality of recording layers. When the depth of each of the pits is represented by H, the wavelength of the light irradiated on the pits is represented by $\lambda$, and the refractive index of the substrate of the optical recording medium is represented by n, then H, $\lambda$, and n satisfy: $\lambda/6n \leq H < \lambda/4n$. A region where the pits are formed is divided into a plurality of cells each having the same area, a multi-level reproduction signal is generated in response to occupation by the pits in each of the cells, and a spherical aberration $W_{40}$ included in condensed light satisfies: $W_{40} \leq 0.07$ $\lambda$rms.

According to a second aspect of the present invention, there is provided an optical pickup device that irradiates light to a plurality pits in an optical recording medium having a plurality of recording layers and receives light reflected from the pits. The depth of each of the pits represented by H, the refractive index of the medium substrate of the optical recording medium represented by n, and the wavelength $\lambda$ of the light irradiated on the pits satisfy: $\lambda/6n \leq H < \lambda/4n$. A region where the pits are formed is divided into a plurality of cells each having the same area, a multi-level reproduction signal is generated in response to occupation by the pits in each of the cells, and a spherical aberration $W_{40}$ included in condensed light satisfies: $W_{40} 0.07$ $\lambda$rms.

According to a third aspect of the present invention, there is provided an optical reproduction device that irradiates light to a plurality of pits in an optical recording medium having a plurality of recording layers and reproduces information signals based on amount of light reflected from the pits, the optical reproduction device comprising an optical pickup device that irradiates the light to the pits and receives light reflected from the pits, wherein the depth of each of the pits represented by H, the refractive index of the medium substrate of the optical recording medium represented by n, and a wavelength $\lambda$ of the light irradiated on the pits satisfy: $\lambda/6n \leq H < \lambda/4n$. A region where the pits are formed is divided into a plurality of cells having the same area, a multi-level reproduction signal is generated in response to occupation by the pits in each of the cells, and a spherical aberration $W_{40}$ included in condensed light satisfies: $W_{40} \leq 0.07$ $\lambda$rms.

As an embodiment, the optical reproduction device further includes a light source that emits the light; an object lens that condenses the light from the light source to a selected one of the recording layers; an optical system that directs the light reflected from the selected recording layer to a light receiving position; an optical detector that is arranged at the light receiving position to receive the reflected light; and an aberration correction unit that, according to the selected recording layer, selects one of a plurality of aberration correction values defined in advance to correct an aberration, wherein the optical recording medium includes a first recording layer and a second recording layer; when the first recording layer is selected, the aberration correction unit selects such an aberration correction value that a spherical aberration is substantially a minimum at a position between the first recording layer and the second recording layer and t/4 away from the first recording layer, where t represents the interval between the first recording layer and the second recording layer; and when the second recording layer is selected, the aberration correction unit selects such an aberration correction value that a spherical aberration is substantially a minimum at a position between the first recording layer and the second recording layer and 3t/4 away from the first recording layer.

As an embodiment, the object lens is arranged such that when the incident light beam is a parallel light beam, a wave aberration is substantially a minimum at a position between the first recording layer and the second recording layer and t/2 away from the first recording layer.

As an embodiment, the optical reproduction device further includes a light source that emits the light; an object lens that condenses the light from the light source to a selected one of the recording layers; an optical system that directs the light reflected from the selected recording layer to a light receiving position; an optical detector that is arranged at the light receiving position to receive the reflected light; and an aberration correction unit that, according to the selected recording layer, selects one of a plurality of aberration correction values defined in advance to correct an aberration, wherein the optical recording medium includes a first recording layer and a second recording layer; when the first recording layer is selected, the aberration correction unit selects such an aberration correction value that a spherical aberration is substantially a minimum at a position between the first recording layer and the second recording layer and t/3 away from the first recording layer, where t represents the interval between the first recording layer and the second recording layer; and when the second recording layer is selected, the aberration correction unit selects such an aberration correction value that a spherical aberration is substantially a minimum at a position between the first recording layer and the second recording layer and 2t/3 away from the first recording layer.

As an embodiment, the object lens is arranged such that when the incident light beam is a parallel light beam, a wave aberration is substantially a minimum at a position corresponding to one of the first recording layer and the second recording layer.

According to a fourth aspect of the present invention, there is provided an optical recording medium comprising a plurality of recording layers; and a plurality of pits, information signals being generated based on amount of light reflected from the pits, wherein the wavelength of light irradiated on the pits represented by $\lambda$, the depth H of each of the pits, and the refractive index n of a medium substrate of the optical recording medium satisfy: $\lambda/6n \leq H < \lambda/4n$. A region where the pits are formed is divided into a plurality of cells each having the same area, a multi-level reproduction signal is generated in response to occupation by the pits in each of the cells, and a spherical aberration $W_{40}$ included in condensed light satisfies: $W_{40} \leq 0.07$ $\lambda$rms.

As an embodiment, the pits are nearly round patterns at centers of the respective cells and have different radii corresponding to modulation of areas of the pits.

As an embodiment, the multi-level reproduction signal has N levels, where N=2, 3, 4, . . . , and the pits have (N−1) different radii in response to the area modulation such that magnitudes of the amount of light reflected from the pits having different radii substantially equally divide an interval from a value of the amount of light related to one of the pits having the largest diameter to a value of the amount of light related to one of the cells without a pit.

As an embodiment, the optical recording medium includes a first recording layer and a second recording layer; an interval t between the first recording layer and the second recording layer, and an equivalent refractive index n of the first recording layer and the second recording layer satisfy: $t \leq 15n^3\lambda/\{(n^2-1)NA^4\}$, where, NA represents the numerical aperture of an object lens for condensing the light from a light source to a selected one of the recording layers, and $\lambda$ represents the wavelength of the light from the light source.

As an embodiment, the optical recording medium includes a first recording layer and a second recording layer; an interval t between the first recording layer and the second recording layer, and an equivalent refractive index n of the first recording layer and the second recording layer satisfy: $t \leq 11n^3\lambda/\{(n^2-1)NA^4\}$, where NA represents the numerical aperture of the object lens for condensing the light from the light source to a selected one of the recording layers, and $\lambda$ represents the wavelength of the light from the light source.

According to the present invention, the pit depth H is set in a range from $\lambda/6n$ to $\lambda/4n$; when the pit depth H is $\lambda/6n$, the amplitude of a push-pull signal becomes maximum, and when the pit depth H is $\lambda/4n$, the difference of amplitudes of reproduction signals related to different pit sizes becomes maximum, namely, when the pit depth H is $\lambda/4n$, the signal-to-noise (S/N) ratio of the reproduction signal becomes maximum. Due to this, it is possible to detect a track error signal by the push-pull method even for a read-only optical recording medium formed with pits, although the push-pull method is generally used for a recordable optical recording medium. In other words, when data are recorded in each cell in accordance with pit occupation, the pits, which are sequentially arranged, turn out to be observed by a beam spot as being equivalent to continuous grooves (tracks), and hence, the read-only optical recording medium is compatible with the recordable optical recording medium. In the read-only optical recording medium, the track error signal can be generated in the same way as in the recordable optical recording medium.

In addition, because the spherical aberration $W_{40}$ satisfies $W_{40} \leq 0.07$ $\lambda$rms, it is possible to maintain modulation of multi-level signals, which correspond to pits having pit depths satisfying $\lambda/6n \leq H < \lambda/4n$, to be greater than 60%, hence stable signals can be obtained.

These and other objects, features, and advantages of the present invention will become more apparent from the following detailed description of preferred embodiments given with reference to the accompanying drawings.

BRIEF DESCRIPTION OF THE DRAWINGS

FIG. 8A through FIG. 8D are diagrams and graphs illustrating a plan view and a cross-sectional view of a pit in the optical recording medium 15, and the push-pull signal and the Rf signal, respectively, according to the first embodiment;

DESCRIPTION OF THE PREFERRED EMBODIMENTS

Below, preferred embodiments of the present invention are explained with reference to the accompanying drawings.

First Embodiment

About Optical Recording Medium

Figure 1A:
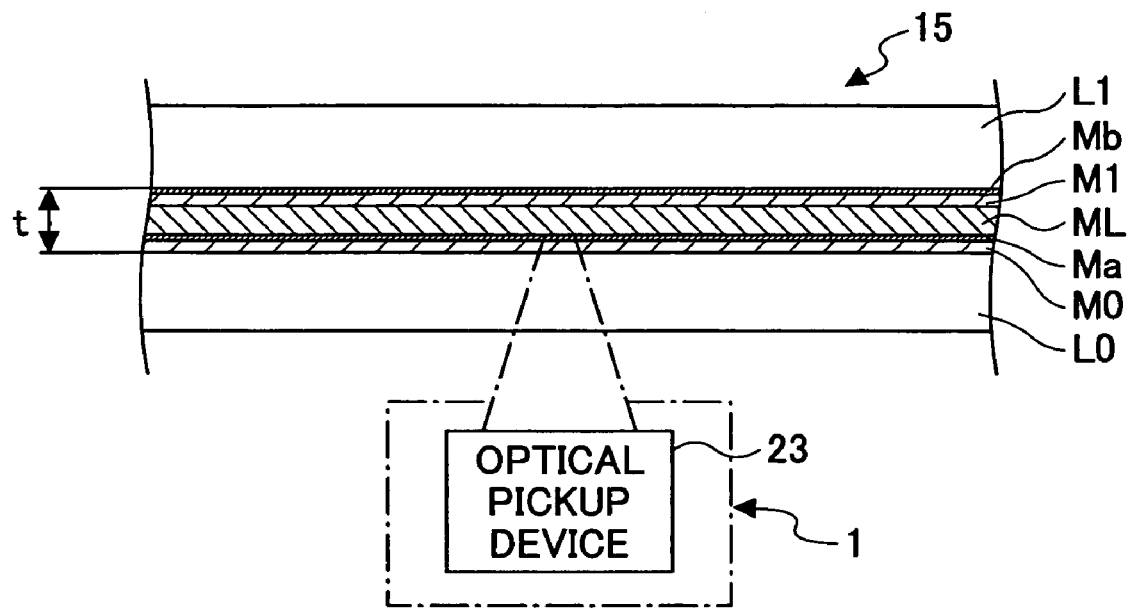
FIG. 1A and FIG. 1B are cross-sectional views schematically illustrating a structure of an optical recording medium according a first embodiment of the present invention.
Figure 1B:
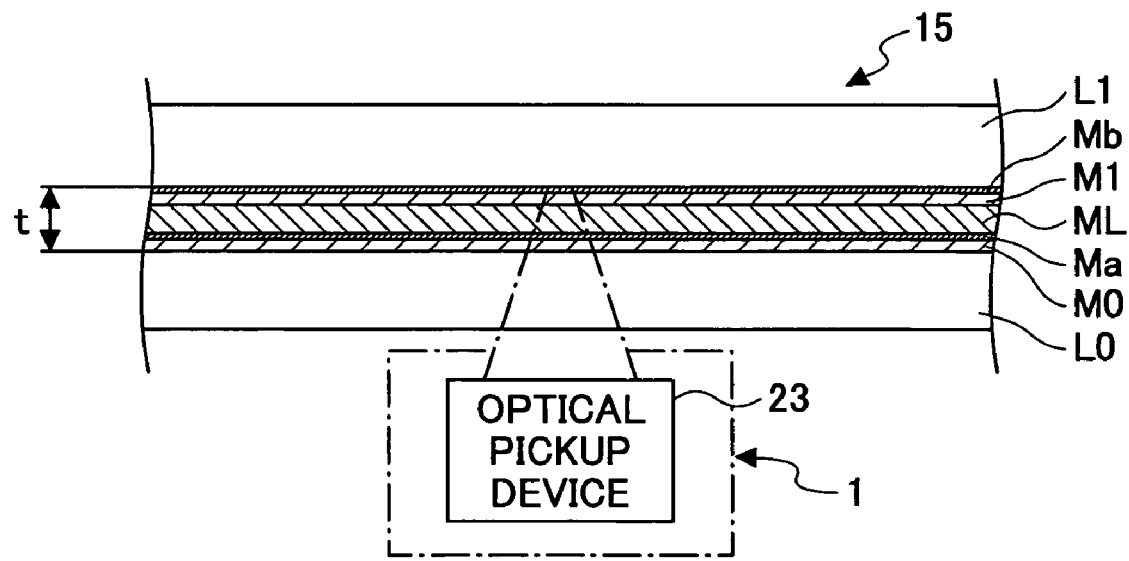

FIG. 1A and FIG. 1B are cross-sectional views schematically illustrating a structure of an optical recording medium according to a first embodiment of the present invention.

The optical recording medium 15 shown in FIG. 1A and FIG. 1B has two recording layers, and an optical pickup device 23 emits a light beam having a wavelength of about 405 nm to the optical recording medium 15.

As shown in FIG. 1A and FIG. 1B, the optical recording medium 15 is a stacked structure, including a first substrate L0, a first recording layer M0, an intermediate layer ML, a second recording layer M1, and a second substrate L1. A semi-transparent film Ma made from gold or dielectric is provided between the first recording layer M0 and the intermediate layer ML, and a metallic reflecting film Mb made from aluminum or others is provided between the second recording layer M1 and the second substrate L1.

In FIG. 1A, the optical device 23 condenses the light beam on the first recording layer M0, and In FIG. 1B, the optical device 23 condenses the light beam on the second recording layer M1.

The intermediate layer ML may be formed from ultraviolet curing resins, which have high transmittance with respect to the light beam emitted from the optical pickup 23, and have refractive indexes close to the refractive index of the substrates. The interval between the first recording layer M0 and the second recording layer M1, that is, the thickness of the intermediate layer ML plus the thickness of the semi-transparent film Ma, is represented by t. In fact, because the semi-transparent film Ma is much thinner than the intermediate layer ML, in the following descriptions, just for convenience, the quantity t is also used to represent the thickness of the intermediate layer ML.

The quantity t is described in detail below.

On the first recording layer M0 and the second recording layer M1, there are formed tracks including spiral-shaped or concentric-shaped sequences of pits and reproduction signals are generated based on the amount of light reflected from the pits.

In the optical recording medium 15, the region including the pits is divided into plural cells which have the same area, and multi-level reproduction signals are generated in accordance with pit occupation in each of the cells; in addition, one pit having a modulated area is formed in each cell.

Optical System in Optical Reproduction Device

In FIG. 1A and FIG. 1B, the reference number 1 indicates an optical reproduction device of the present embodiment, which optically reproduces information recorded in the optical recording medium 15. Because the circuitry and the control system of the optical reproduction device 1 are well known, descriptions thereof are omitted.

Figure 2:
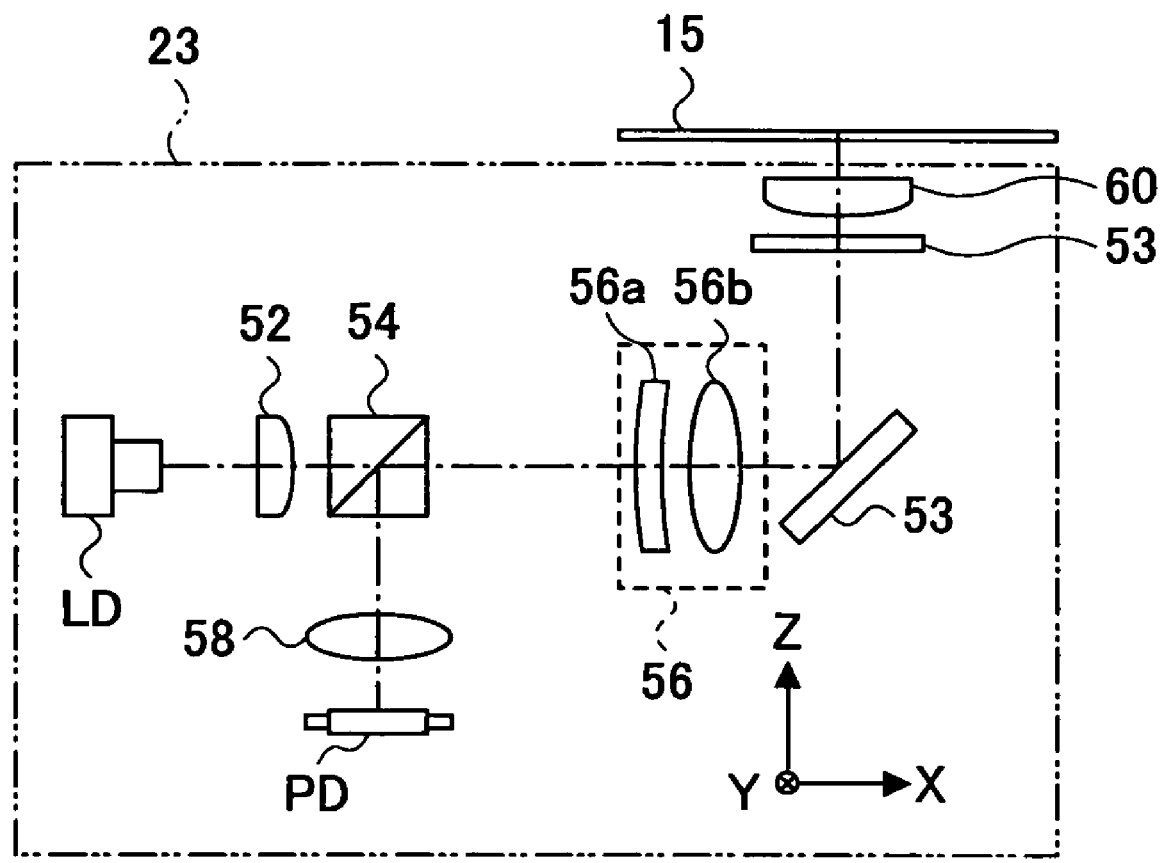
FIG. 2 is a diagram illustrating a schematic configuration of an optical system of the optical pickup device 23 in the optical reproduction device 1 according to the first embodiment.

FIG. 2 is a diagram illustrating a schematic configuration of an optical system of the optical pickup device 23 in the optical reproduction device 1 according to the present embodiment.

In the present embodiment, the optical pickup device 23 includes a light source LD emitting a laser beam having a wavelength of 405 nm, and an object lens 60 having a numerical aperture (NA) of 0.65. The light source LD and the object lens 60 form an irradiating optical system.

In the present embodiment, various calculations are made, assuming that the optical recording medium 15 has constant track pitches of 0.43 μm, different thicknesses of the intermediate layer ML, different pit depths, and different pit diameters, so as to verify the validity of the optical recording medium 15 of the present invention.

Returning to FIG. 2, the optical pickup device 23 further includes a collimator lens 52 for converting the laser beam from the light source LD to a parallel beam, a beam splitter 54 for transmitting the light beam irradiating on the pits and deflecting a returning light beam, which is a light beam reflected from the pits, an aberration correction section 56, a deflecting mirror 53, a detection lens 58 for converting the split reflected light to an image on an optical detector PD. The detection lens 58 and the optical detector PD form a light receiving optical system.

For example, track error signals are detected by a push-pull method, which is generally used for a recordable optical recording medium.

The aberration correction section 56 is arranged on the +X side of the beam splitter 54, and includes a concave lens 56a serving as a negative lens, a convex lens 56b serving as a positive lens, and a lens driver (not illustrated) for driving at least one of the concave lens 56a and the convex lens 56b to change the distance between the concave lens 56a and the convex lens 56b. When the distance between the concave lens 56a and the convex lens 56b is changed, imaging magnification of the object lens 60 changes; thereby, relevant spherical aberration changes.

In the present embodiment, it is defined that when a substantially parallel light beam is incident on the object lens 60, the position at which a wave aberration is substantially minimum (this position is referred to as "aberration reference position", hereinafter), is substantially at the center of the intermediate layer ML along the optical axis direction of the object lens 60.

Pit Shape and Reproduction Signal

Results of the above-mentioned calculations are described below.

Figure 3:
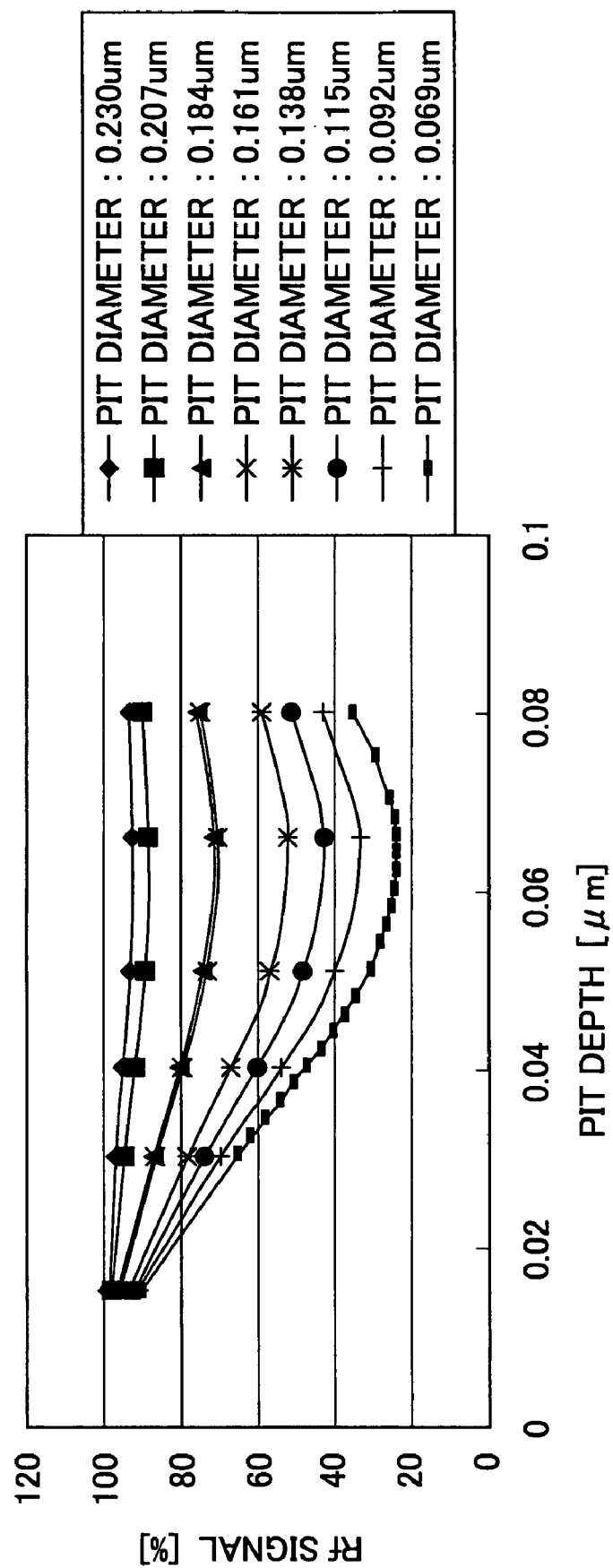
FIG. 3 shows graphs illustrating relations between the pit depth, pit diameter, and the reproduction signal.
Figure 4A:
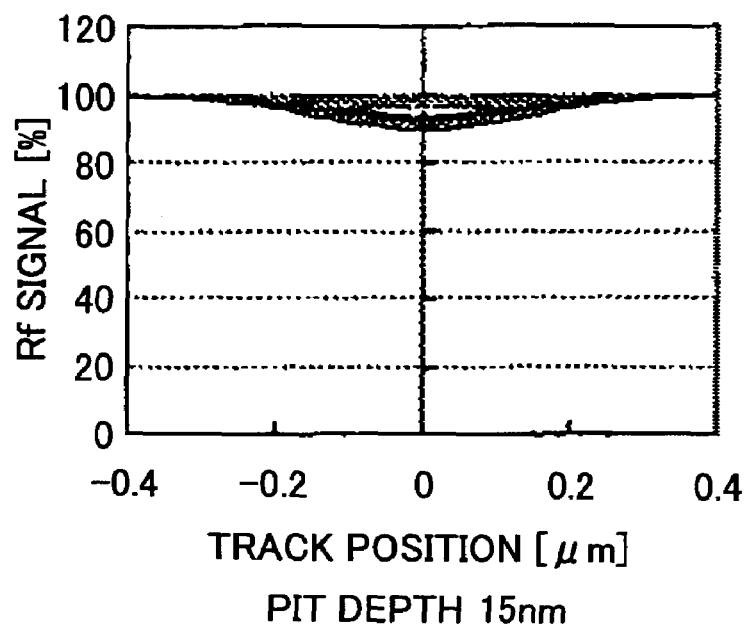
FIG. 4A through FIG. 4F show graphs illustrating relations between the Rf signals shown in FIG. 3 and track position.
Figure 4B:
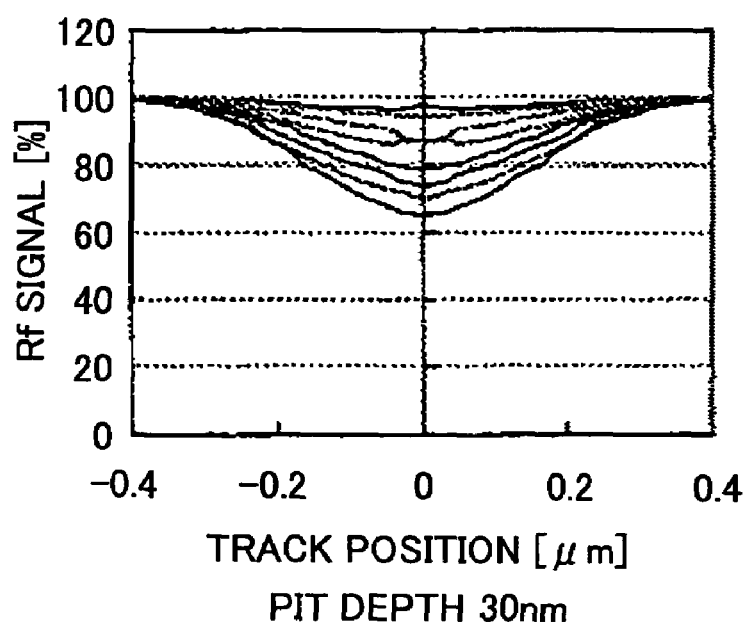
Figure 4C:
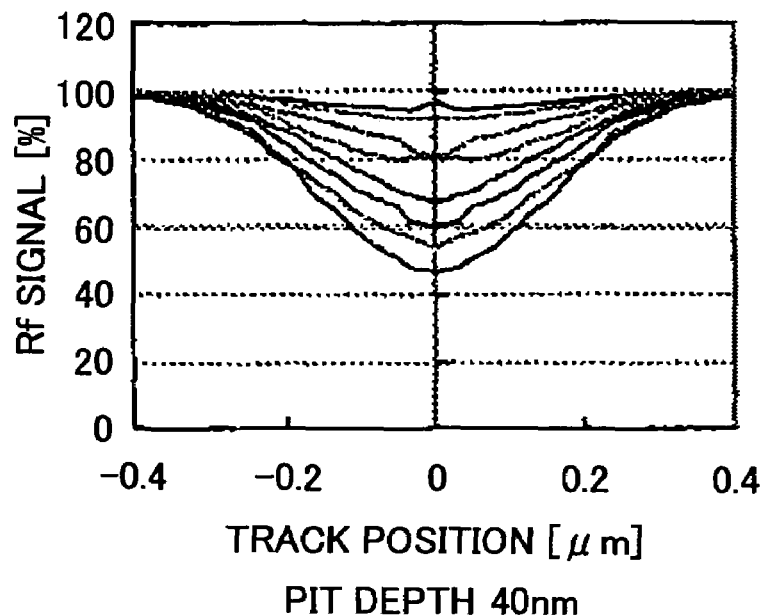
Figure 4D:
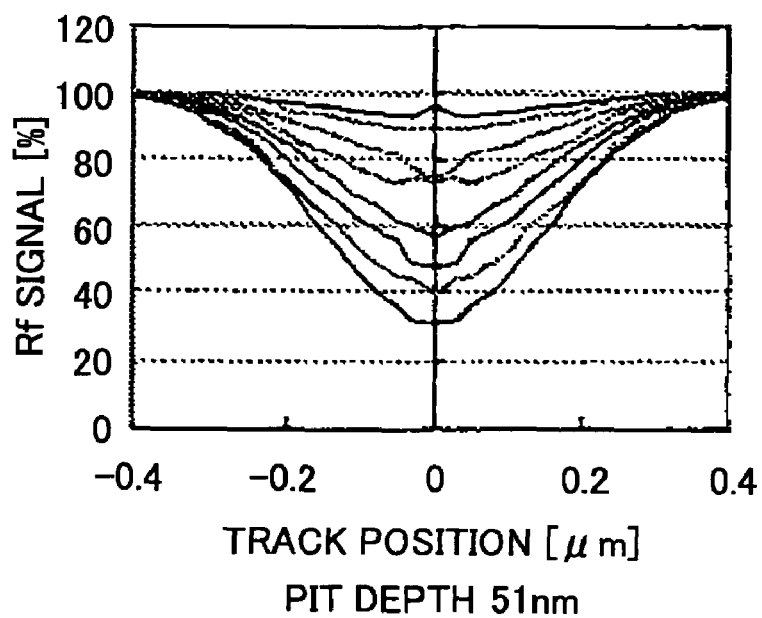
Figure 4E:
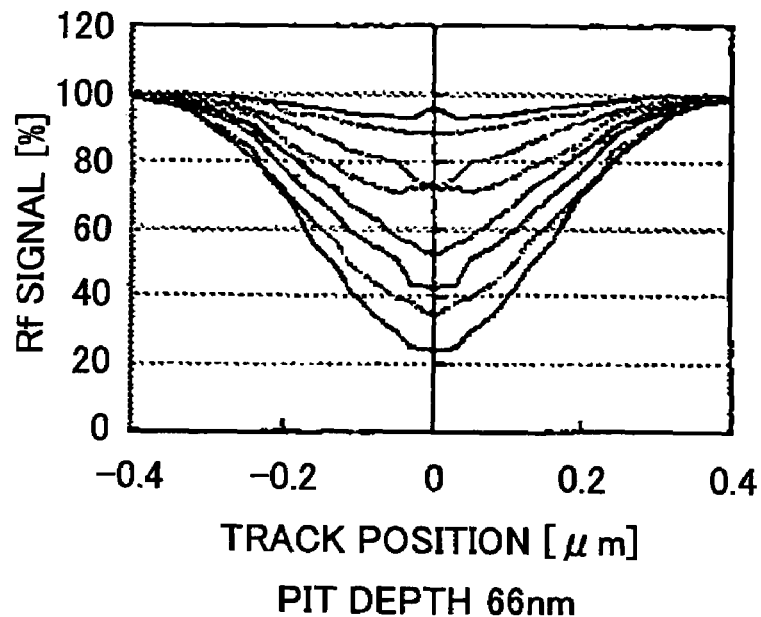
Figure 4F:
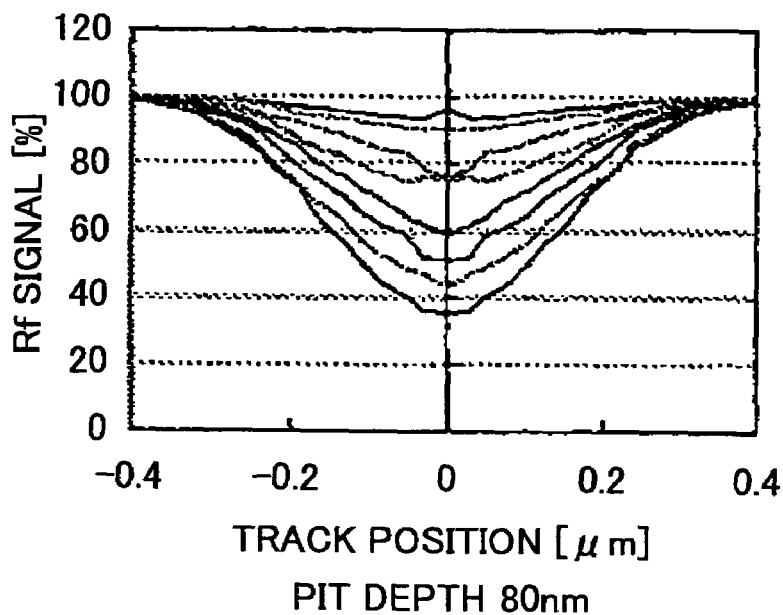

FIG. 3 shows graphs illustrating relations between the pit depth, pit diameter, and the reproduction signal (indicated as "Rf signal"), where, the abscissa represents the pit depth, the ordinate represents the Rf signal in an on-track state, and different graphs in FIG. 3 correspond to different pit diameters. In FIG. 3, in order from a large Rf signal to a small Rf signal, the pit diameters are 0.230 μm, 0.207 μm, 0.184 μm, 0.161 μm, 0.138 μm, 0.115 μm, 0.092 μm, and 0.069 μm, respectively.

FIG. 4A through FIG. 4F show graphs illustrating relations between the Rf signals shown in FIG. 3 and track position.

Specifically, FIG. 4A through FIG. 4F show dependence of the characteristic of the Rf signals on the track position at different pit depths. In each of FIG. 4A through FIG. 4F, different curves correspond to different pit diameters, and in order from a large Rf signal to a small Rf signal, the pit diameters are 0.230 μm, 0.207 μm, 0.184 μm, 0.161 μm, 0.138 μm, 0.115 μm, 0.092 μm, and 0.069 μm, respectively.

Further, values of the curves at centers of tracks, as shown in FIG. 4A through FIG. 4F, correspond to the curves in FIG. 3.

In addition, the Rf signal becomes a minimum when the pit depth is 0.066 μm (approximately equal to $\lambda/4n$) and the pit diameter is 0.230 μm.

Pit Shape and Push-Pull Signal

Figure 5:
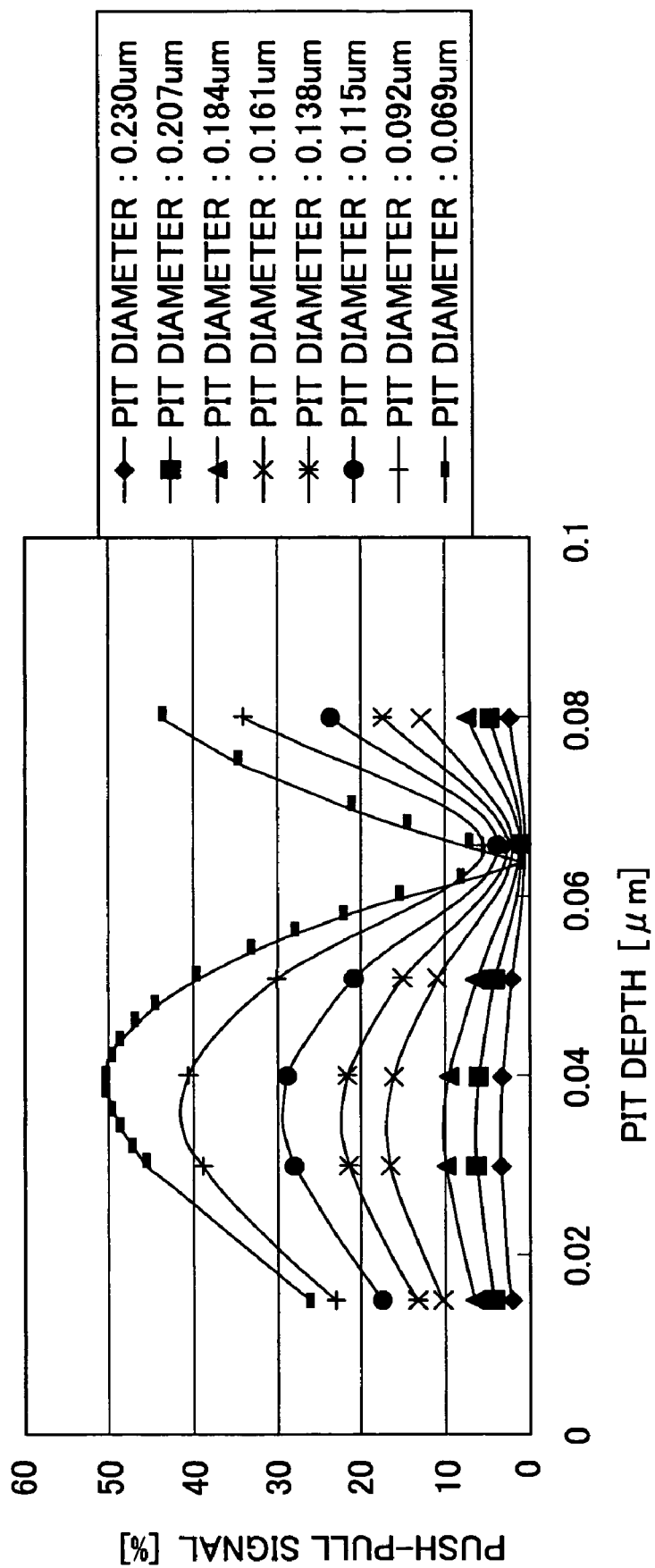
FIG. 5 shows graphs illustrating relations between the pit depth, pit diameter, and the push-pull signal.
Figure 6A:
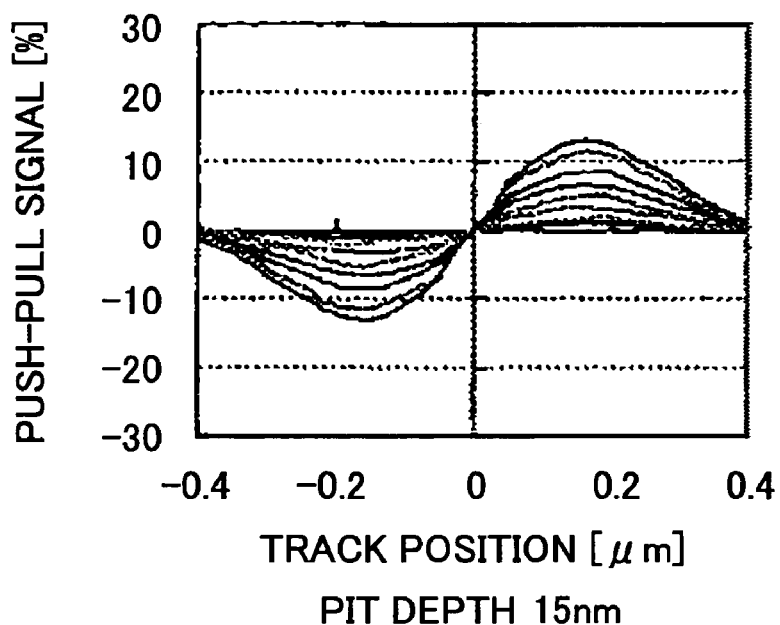
FIG. 6A through FIG. 6F show graphs illustrating relations between the push-pull signals shown in FIG. 5 and track position.
Figure 6B:
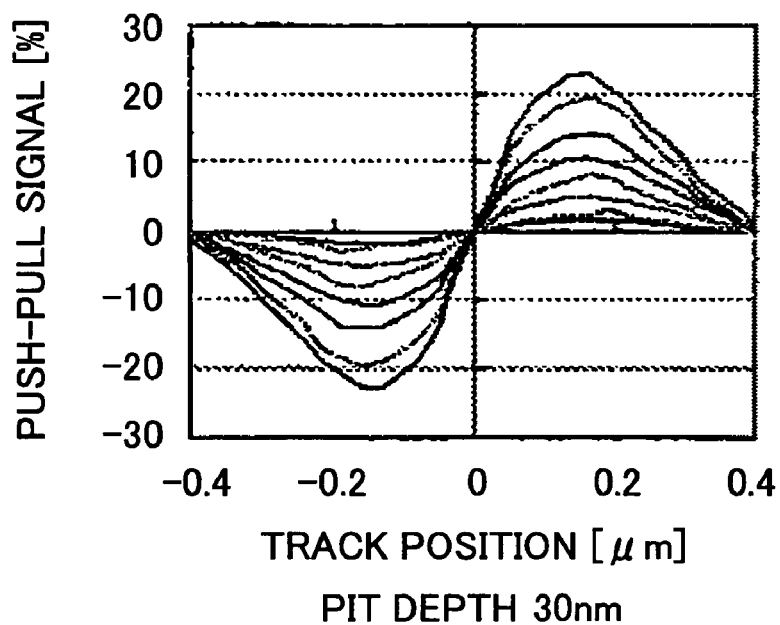
Figure 6C:
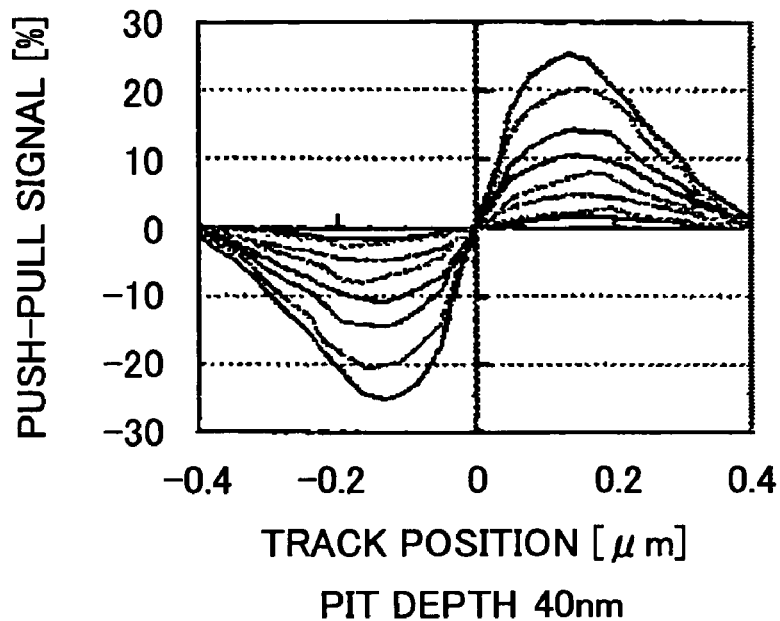
Figure 6D:
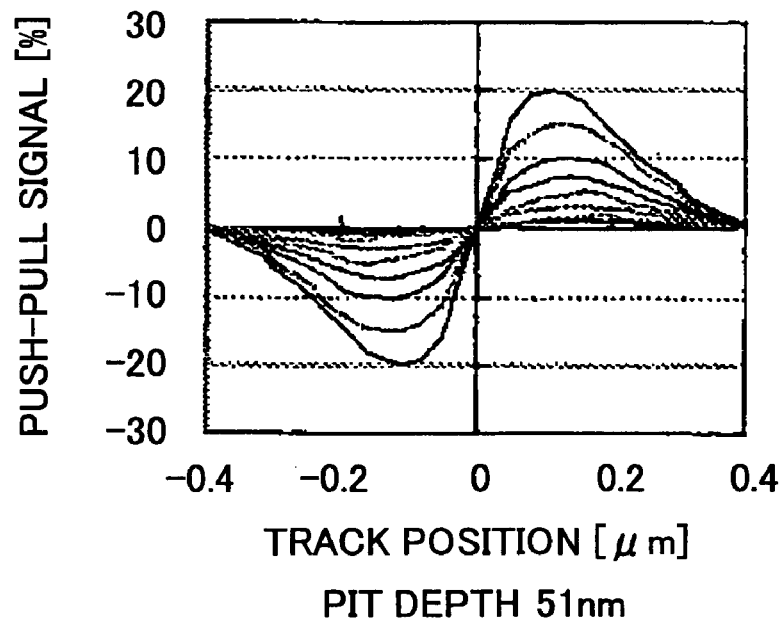
Figure 6E:
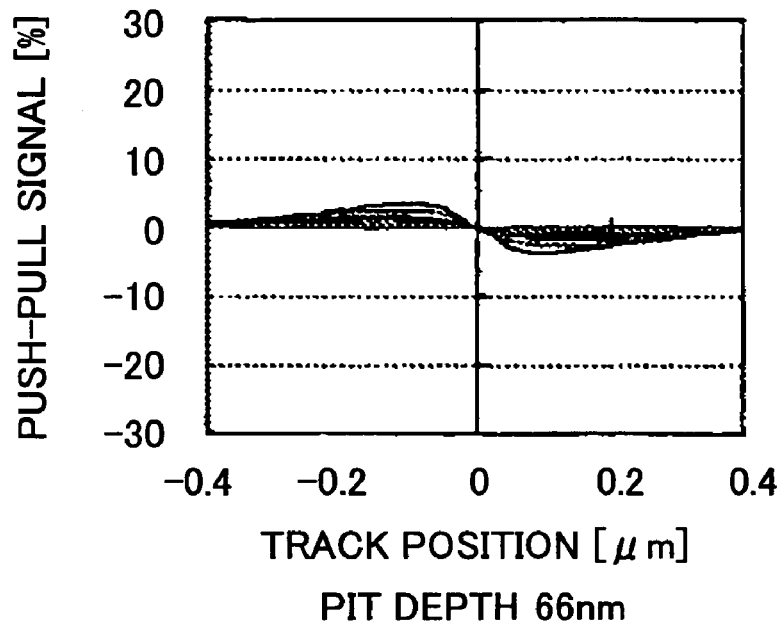
Figure 6F:
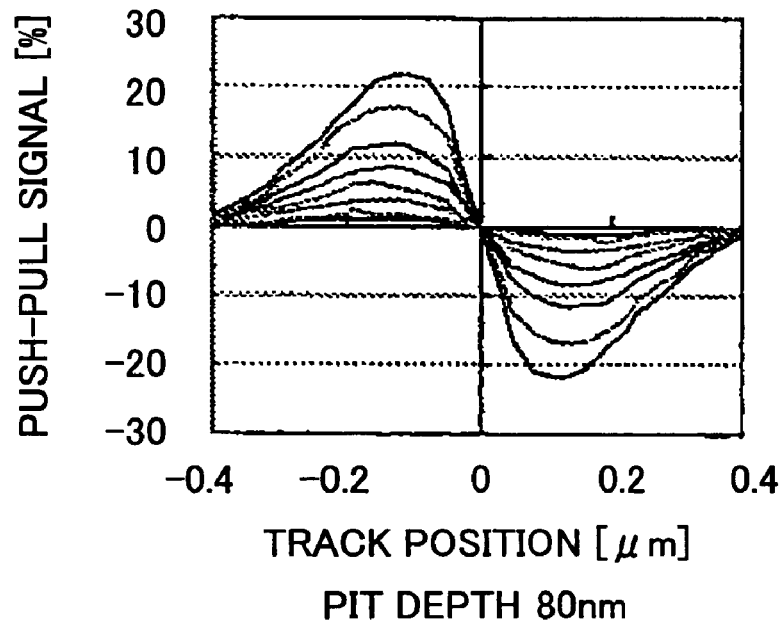

FIG. 5 shows graphs illustrating relations between the pit depth, pit diameter, and the push-pull signal, where, the abscissa represents the pit depth, the ordinate represents the amplitude of the push-pull signal, and different curves in FIG. 5 correspond to different pit diameters. In FIG. 5, in order from large amplitude of the push-pull signal to small amplitude of the push-pull signal, the pit diameters are 0.230 μm, 0.207 μm, 0.184 μm, 0.161 μm, 0.138 μm, 0.115 μm, 0.092 μm, and 0.069 μm, respectively.

FIG. 6A through FIG. 6F show graphs illustrating relations between the push-pull signals shown in FIG. 5 and track position.

Specifically, FIG. 6A through FIG. 6F show dependence of the characteristics of the amplitudes of the push-pull signals on the track position at different pit depths, for example, 15 nm, 30 nm, 40 nm, 51 nm, 66 nm, and 80 nm.

In each of FIG. 6A through FIG. 6F, different graphs correspond to different pit diameters, and in order from a large the amplitude of the push-pull signal to a small the amplitude of the push-pull signal, the pit diameters are 0.230 μm, 0.207 μm, 0.184 μm, 0.161 μm, 0.138 μm, 0.115 μm, 0.092 μm, and 0.069 μm, respectively.

In FIG. 6A through FIG. 6F, if the maximum of an amplitude curve of the push-pull signal is represented by PPmax and the minimum of the amplitude curve of the push-pull signal is represented by PPmin, the amplitude (PP) of the push-pull signal is expressed by PP=PPmax−Ppmin.

In addition, the amplitude of the push-pull signal becomes a maximum when the pit depth is 0.004 μm (approximately equal to $\lambda/6n$) and the pit diameter is 0.069 μm; the amplitude of the push-pull signal becomes a minimum when the pit depth is 0.064 μm (approximately equal to $\lambda/4n$) and the pit diameter is 0.23 μm.

Detection of Push-Pull Signal and Rf signal

Below, descriptions are made of the push-pull signal and the Rf signal with reference to FIG. 7A and FIG. 7B, and FIG. 8A through FIG. 8D.

Figure 7A:
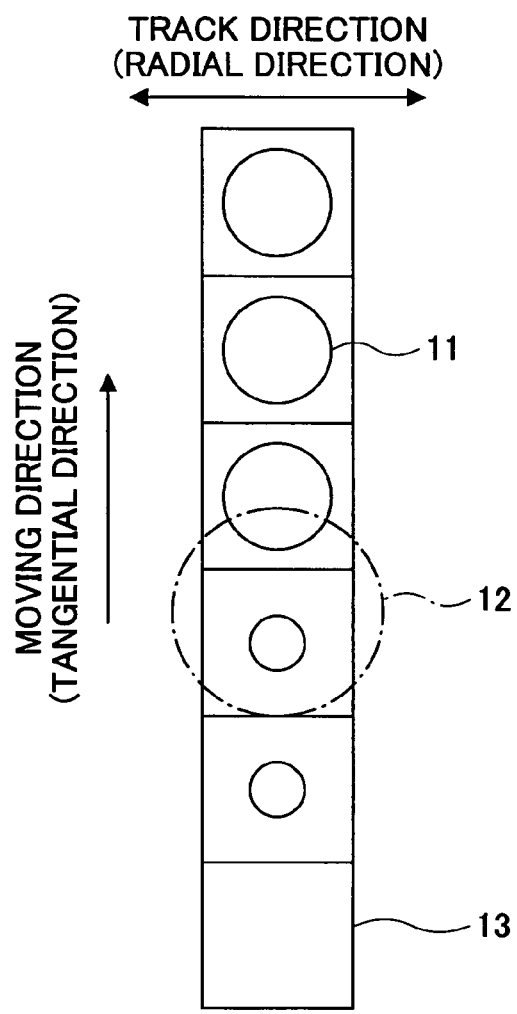
FIG. 7A and FIG. 7B are diagrams illustrating configurations of pits and cells in the optical recording medium 15 and a configuration of the optical detector PD, respectively, according to the first embodiment.
Figure 7B:
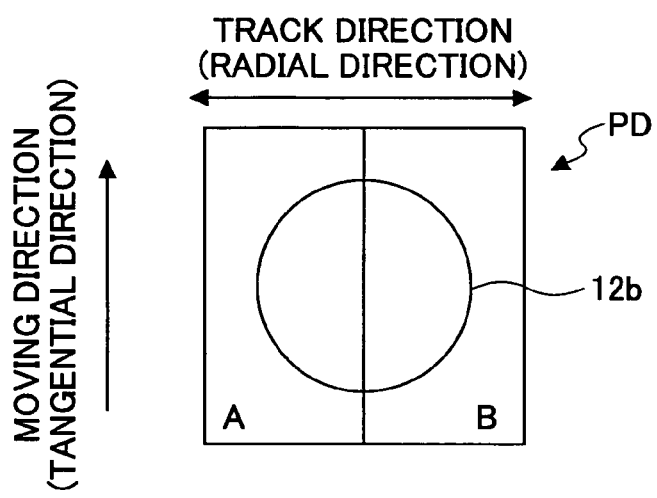

FIG. 7A and FIG. 7B are diagrams illustrating configurations of pits and cells in the optical recording medium 15 and a configuration of the optical detector PD, respectively, according to the present embodiment.

Specifically, FIG. 7A shows the situation in which a beam spot 12 of the incident light beam relatively moves on a pit 11. The reflected light beam from the pit 11 is directed to the optical detector PD.

FIG. 7B shows a beam spot 12b of the reflected light beam on a light-receiving region of the optical detector PD. As shown in FIG. 7B, the light-receiving region of the optical detector PD includes light receiving elements forming two equal divisional light-receiving regions A and B, and the beam spot 12b is symmetrically divided into two parts in the radial direction.

Generally, the optical detector PD may include at least one pair of the light-receiving regions A and B symmetrically arranged along the moving direction of the optical recording medium 15, and the light-receiving regions A and B are located in a zone where the 0-order reflected light and the ±1 order diffracted light come together.

Especially, in the present embodiment, the pits 11 are round-shaped patterns having different radii in response to modulation of pit areas. In each of cells 13, which are equally divided regions, one pit having a modulated area is formed at the center position. For example, it may be set that the size of each cell 13 is less than the size of the beam spot 12.

Output signals a and b from the respective divisional light-receiving regions A and B are used as the push-pull signal TE1 and the reproduction signal Rf, respectively, which function as track error signals.

The push-pull signal TE1 and the reproduction signal Rf can be expressed by the following formula (2).

$$TE1=(a-b)/(a+b)$$

$$Rf=(a+b)/\max(a+b) \quad (2)$$

FIG. 8A through FIG. 8D are diagrams and graphs illustrating a plan view and a cross-sectional view of a pit in the optical recording medium 15, and the push-pull signal and the Rf signal, respectively, according to the present embodiment.

Specifically, FIG. 8A through FIG. 8D explain methods of obtaining the push-pull signal and the Rf signal presented in FIG. 3 and FIG. 5, respectively.

The reproduction signal Rf corresponds to a sum of the quantities of the returning light beams to the divisional light-receiving regions A and B, respectively, when the incident light beam is irradiated to the optical recording medium 15 and the beam spot 12 is formed on the optical recording medium 15. When the beam spot 12 is located on the pit 11, the incident light is diffracted by the pit 11, and this diffraction results in reduction of the quantities of the returning light beams to the divisional light-receiving regions A and B, that is, the amounts of the reflected light beams; hence, the level of the Rf signal decreases.

On the other hand, the push-pull signal indicates a bias of the two quantities of the returning light beams to the divisional light-receiving regions A and B, respectively, in the radial direction of the pit 11, when the incident light beam is irradiated to the optical recording medium 15 and the beam spot 12 is formed on the optical recording medium 15. If the beam spot 12 covers the edge of the pit 11, the diffraction direction biases toward the length direction of the pit 11, and the biasing direction changes depending on which of the front edge and the back edge is covered; hence, by calculating the difference of the output signals a and b from the respective divisional light-receiving regions A and B, pulsed signals can be obtained which have different polarities at the front edge and the back edge of the pit 22.

Pit Depth Selection

From FIG. 4A through FIG. 4F, it is found that multiple Rf signal levels are obtainable by varying the pit diameter at any pit depth. In other words, it is possible to perform recording and reproduction of multi-level data by varying the pit diameter.

In addition, from FIG. 5, and FIG. 6A through FIG. 6F, it is found that it is possible to detect the push-pull signal under certain pit conditions even in an optical recording medium in which the pit diameter is less than the beam spot diameter.

Considering compatibility with the recordable optical recording medium on which continuous grooves (tracks) are formed, it is desirable to use the push-pull method to detect the track error signal.

Pit Depth and Pit Diameter

From the above results, it is found that the appropriate bit depth of the pit 11 in the optical recording medium 15 is in a range from $\lambda/6n$ to $\lambda/4n$, where when the pit depth H is $\lambda/6n$, the amplitude of a push-pull signal becomes maximum, and when the pit depth H is $\lambda/4n$, the difference of amplitudes of reproduction signals related to different pit sizes becomes maximum. Preferably, the bit depth of the pit 11 in the optical recording medium 15 may be selected to be near the intermediate value ($\lambda/5n$). It should be noted that the difference of reproduction signal amplitudes becoming maximum indicates that the signal-to-noise (S/N) ratio of the reproduction signal becomes maximum.

Due to the above selection of the pit depth, it is possible to detect a track error signal by the push-pull method even for a read-only optical recording medium formed with pits, such as the optical recording medium 15, even though the push-pull method is generally used for a recordable optical recording medium. In other words, when data are recorded in each cell in accordance with pit occupation, the pits which are sequentially arranged are observed by the beam spot 12 as being equivalent to continuous grooves (tracks); thus, the read-only optical recording medium is compatible with the recordable optical recording medium, and in the read-only optical recording medium, the track error signal can be generated in the same way as in the recordable optical recording medium.

Pit Diameter Selection

Below, descriptions are made of reproduction methods of the above multi-level recording data.

Figure 9:
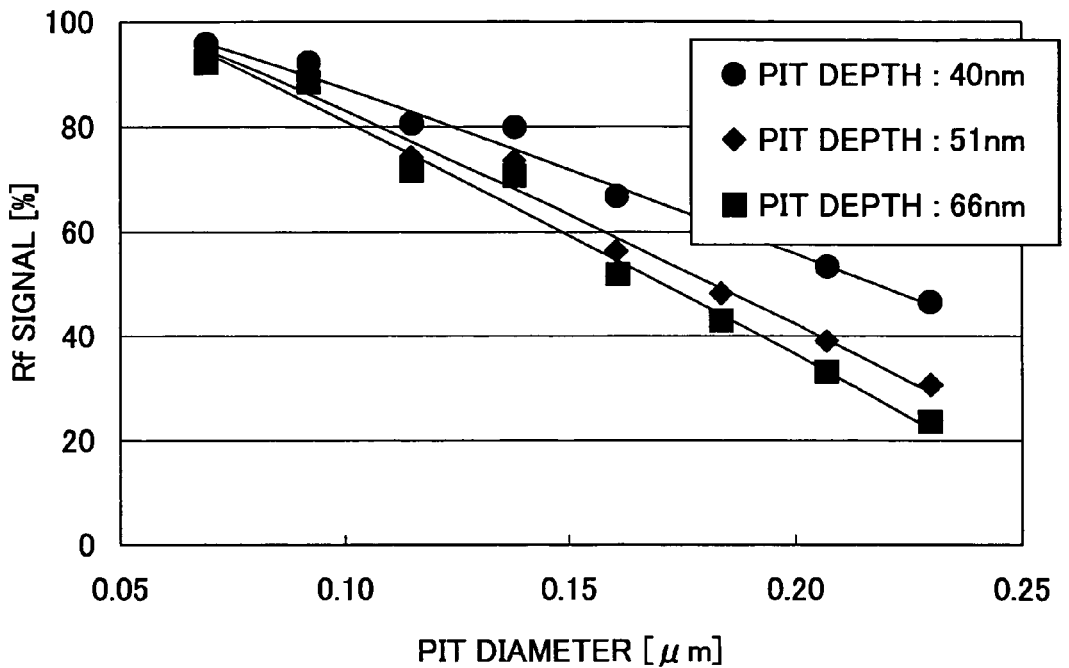
FIG. 9 shows graphs illustrating relations between the pit diameter and the reproduction signal.

FIG. 9 shows graphs illustrating relations between the pit diameter (that is, pit occupation), and the reproduction signal (Rf signal).

In FIG. 9, different from FIG. 3, the abscissa represents the pit diameter, the ordinate represents the Rf signal, different graphs in FIG. 9 correspond to different pit depths, and in order from a large Rf signal to a small Rf signal, the pit depths are 40 nm, 51 nm, and 66 nm, respectively.

In FIG. 9, the pit depth (H) is set to satisfy $H=\lambda/6n$.

As illustrated in FIG. 9, depending on the pit occupation, that is, the ratio of the area of the pit 11 to the area of one cell 13, the level of the Rf signal changes. When the pit 11 does not exist, the level of the Rf signal is the highest, whereas when the pit occupation of the pit 11 is the largest, the level of the Rf signal is the lowest.

Utilizing this relation, the Rf signal can be assigned to have multiple levels.

Figure 10:
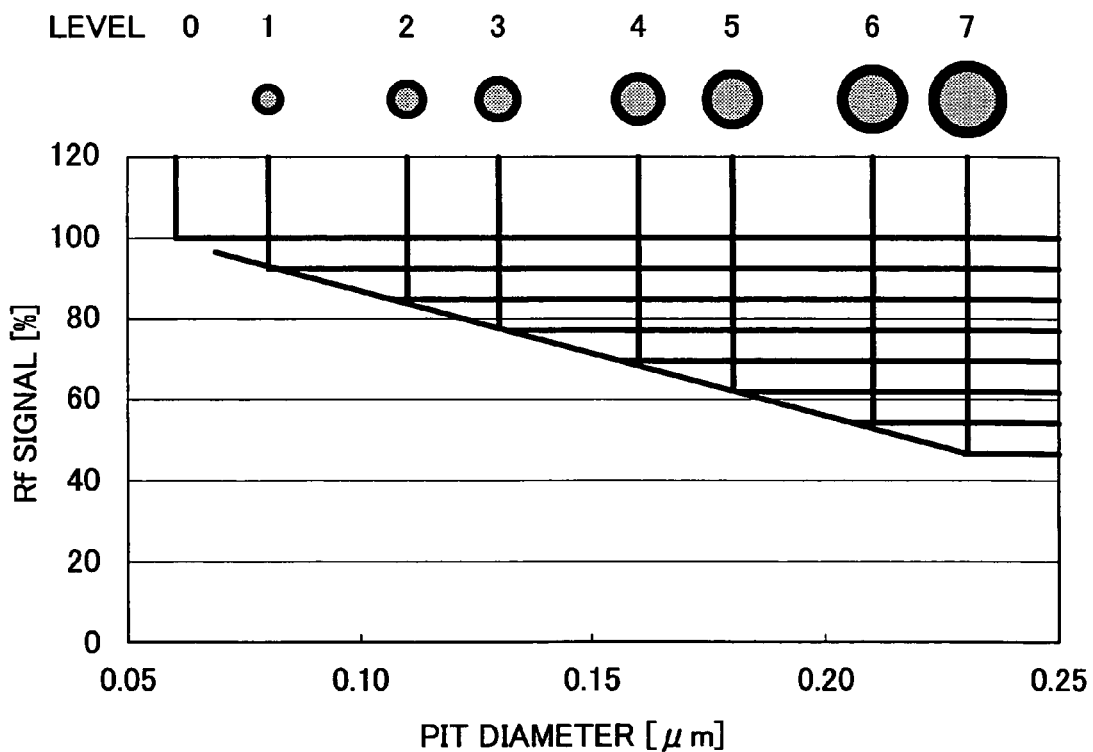
FIG. 10 shows the relation between the pit diameter and the levels of the reproduction signal.

FIG. 10 shows the relation between the pit diameter (that is, pit occupation) and the levels of the reproduction signal (Rf signal).

Specifically, FIG. 10 illustrates eight pit patterns having different sizes, and eight levels of the Rf signal corresponding to the eight different pit patterns (including the no pit state). The eight levels of the Rf signal are denoted to be level 0, level 1, ..., level 7, respectively. The eight pit patterns adopted in FIG. 10 are illustrated in the upper portion. In FIG. 10, the pit depth is 40 nm.

That is, in order to generate a reproduction signal having N=8 levels corresponding to the pit occupation of cells 13, the pit 11 can be designed to have (N−1=7) different pit diameters according to area modulation. The 7 different pit diameters are determined such that the seven levels of the Rf signal corresponding to the seven different pit patterns (that is, seven different values of the amount of light reflected from the pits having the seven different radii) substantially equally divide the interval from a minimum value to a maximum value. Preferably, the level of the Rf signal becomes the maximum when the pit 11 does not exist, whereas the level of the Rf signal becomes the minimum when the diameter of the pit 11 is the largest (namely, when pit occupation by the pit 11 is the largest).

According to the present embodiment, in the read-only the optical recording medium 15 of the present embodiment, the region including the pits 11 are divided into plural cells 13 which have the same area and each of which includes one area-modulated pit 11, and multi-level reproduction signals are generated in accordance with pit occupation in each of the cells 13. Because multi-level data are recorded in the read-only optical recording medium 15 by area modulation, but not by depth modulation as in the related art, in the process of fabricating the read-only the optical recording medium 15 of the present embodiment, a developing step can be executed stably to expose a glass substrate; therefore, it is possible to provide a read-only optical recording medium 15 which is recorded with multi-level data and can be mass-produced easily.

Intermediate Layer Thickness and Reproduction Signal

Next, the thickness of the intermediate layer ML is discussed, which is formed between the first recording layer M0 and the second recording layer M1.

It is known that substrate thickness uncertainties of the optical recording medium 15 cause a spherical aberration when no correction to aberration is made. The spherical aberration caused by the substrate thickness uncertainties increases in proportion to the distance from the above-defined aberration reference position (denoted to be "S"). It is known that such behavior of the spherical aberration can be expressed by the following formula (3).

$$W_{40} \text{ rms} \approx \{1/48\sqrt{5}\}\{(n^2-1)/n^3\}NA^4 \cdot d \qquad (3)$$

where, $W_{40}$ rms represents the spherical aberration expressed by a RMS value, d represents the distance from the aberration reference position S, n represents an equivalent refractive index of the intermediate layer ML, and NA represents the numerical aperture of the object lens 60.

Figure 11:
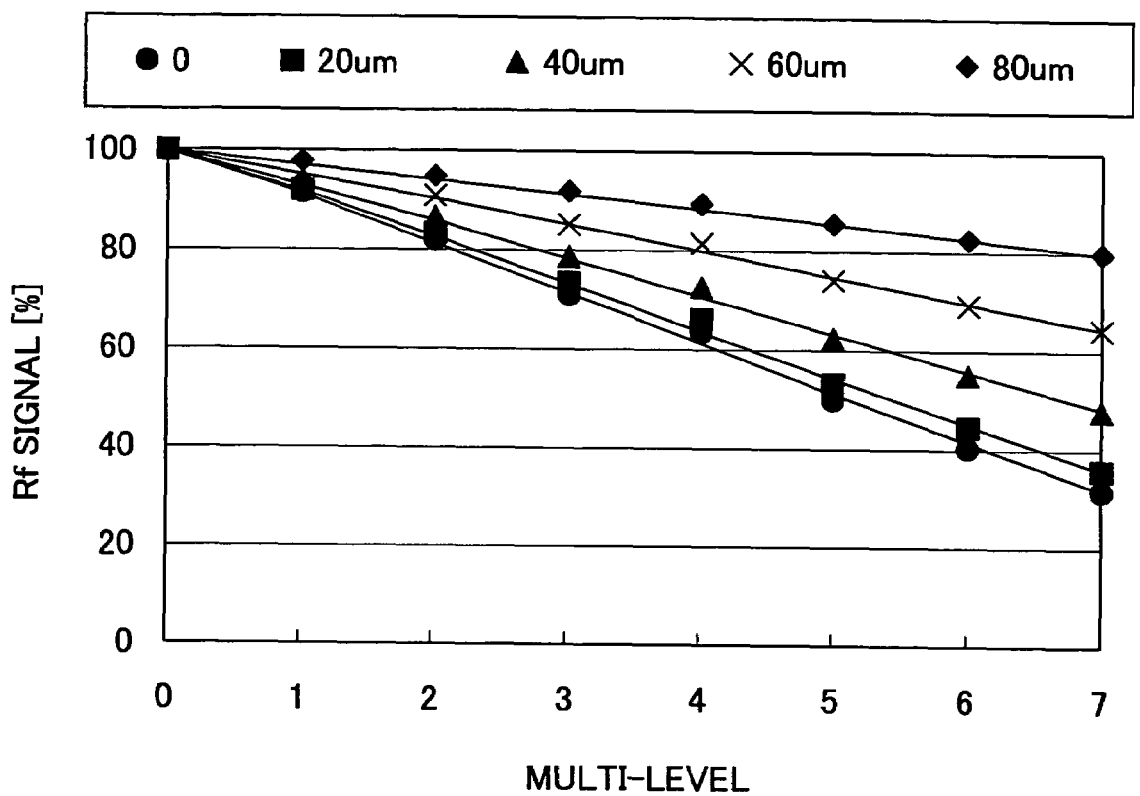
FIG. 11 shows the relation between the thickness of the intermediate layer ML and the levels of the reproduction signal, when no correction to aberration is made.
Figure 12A:
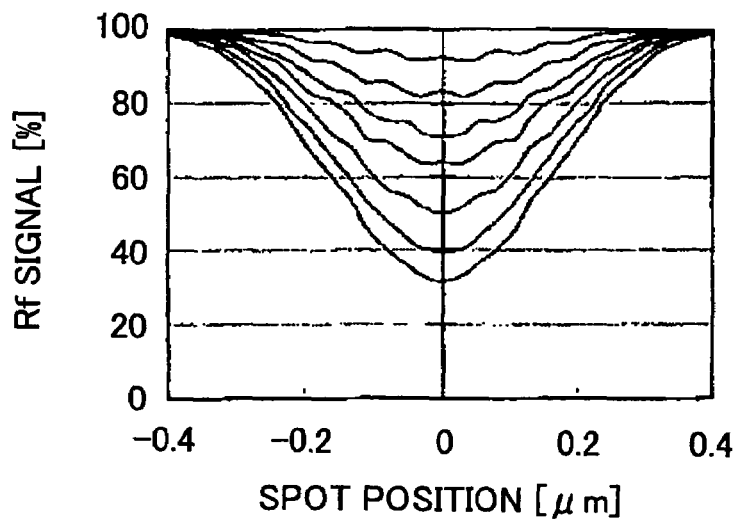
FIG. 12A through FIG. 12E show graphs illustrating relations between the Rf signals shown in FIG. 11 and the track position.
Figure 12B:
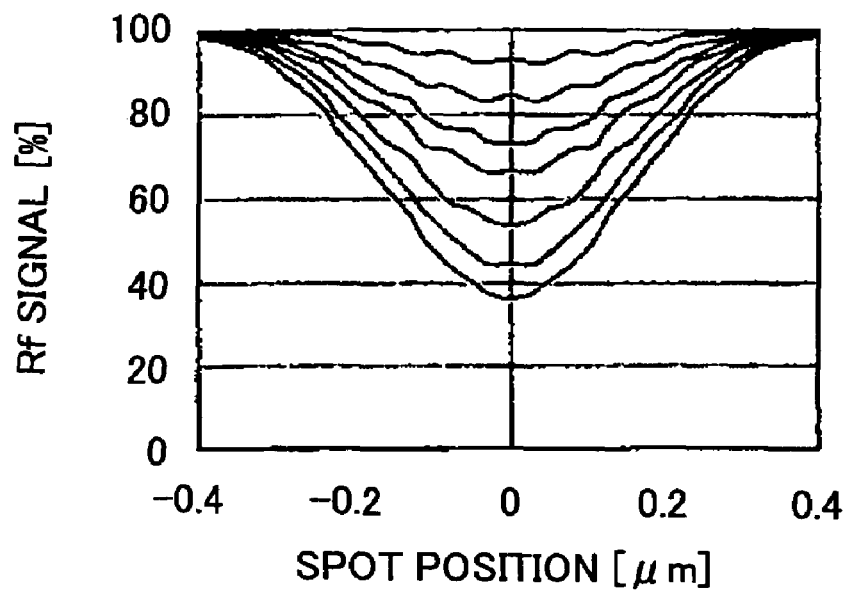
Figure 12C:
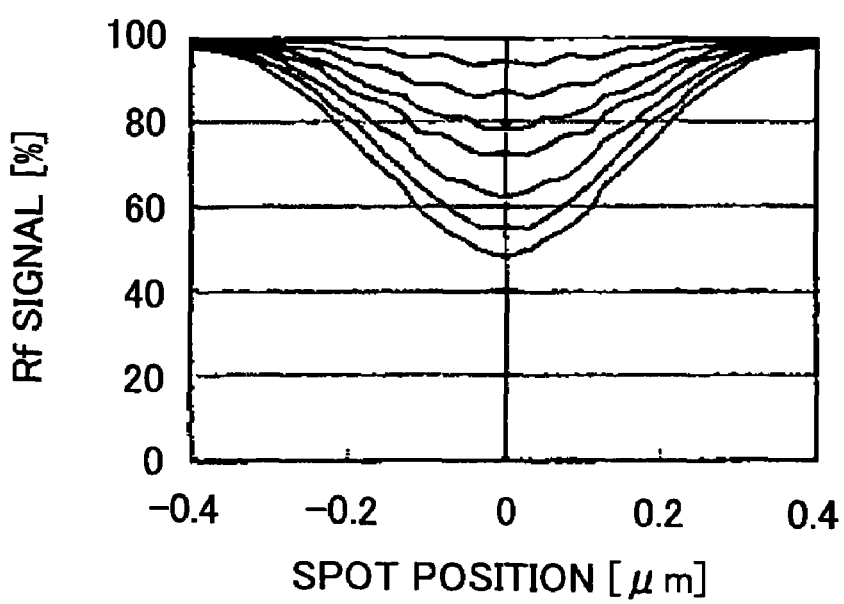
Figure 12D:
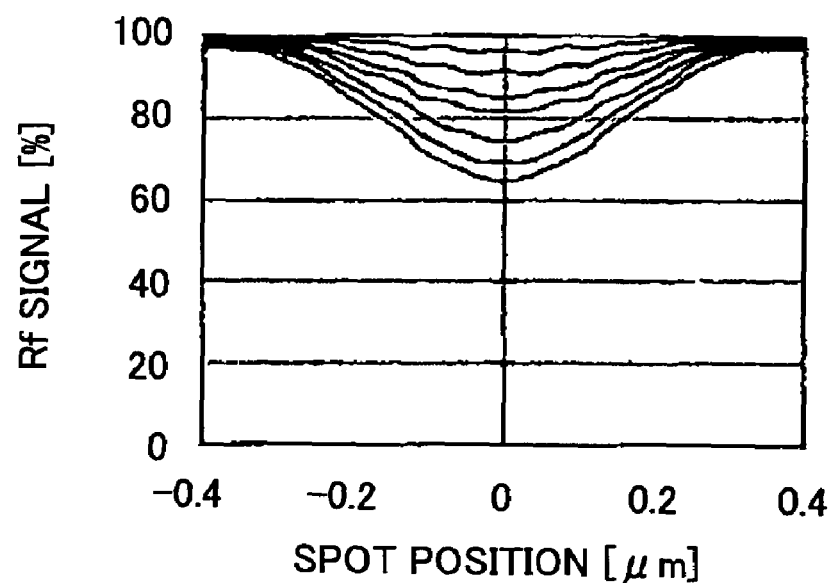
Figure 12E:
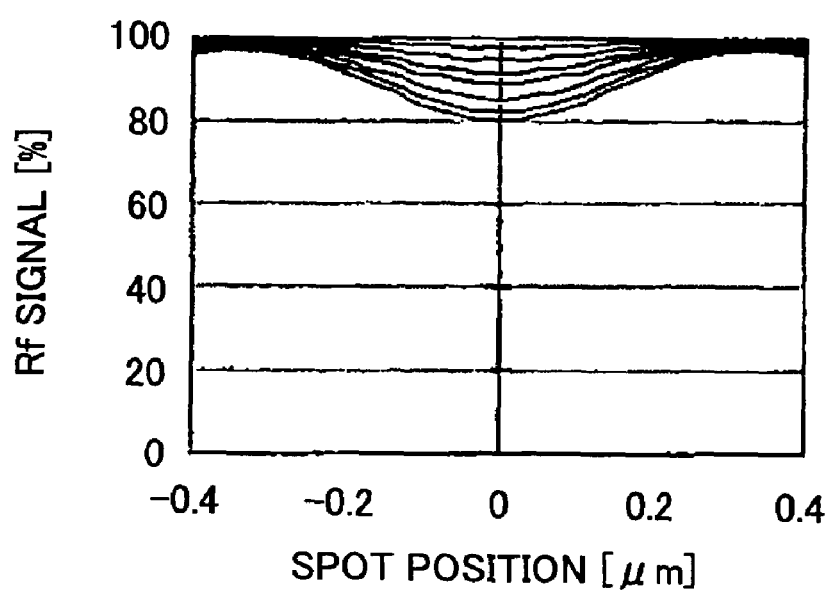

FIG. 11 shows the relation between the thickness of the intermediate layer ML and the above-mentioned multi-levels and the reproduction signal (Rf signal), when no correction to aberration is made, in the optical recording medium 15 which has a numerical aperture (NA) of 0.65, a pit depth of 51 nm, and a corresponding laser beam having a wavelength of 405 nm.

In FIG. 11, the abscissa represents the multiple levels of the reproduction signal, the ordinate represents the Rf signal in an on-track state, and different graphs in FIG. 11 correspond to different substrate thickness uncertainties.

Here, the substrate thickness uncertainty is defined to be the distance from a recording plane to a position at which the spherical aberration is a minimum, when the recording plane is deviated from the position corresponding to the minimum spherical aberration.

FIG. 12A through FIG. 12F show graphs illustrating relations between the Rf signals shown in FIG. 11 and the track position.

Specifically, FIG. 12A through FIG. 12F show dependence of the characteristic of the Rf signals on the track position with different substrate thickness uncertainties.

In each of FIG. 12A through FIG. 12F, different curves correspond to different levels of the Rf signal. From FIG. 12A through FIG. 12F, it is known that separation of different levels of the Rf signal becomes difficult when the substrate thickness uncertainty increases.

Figure 13:
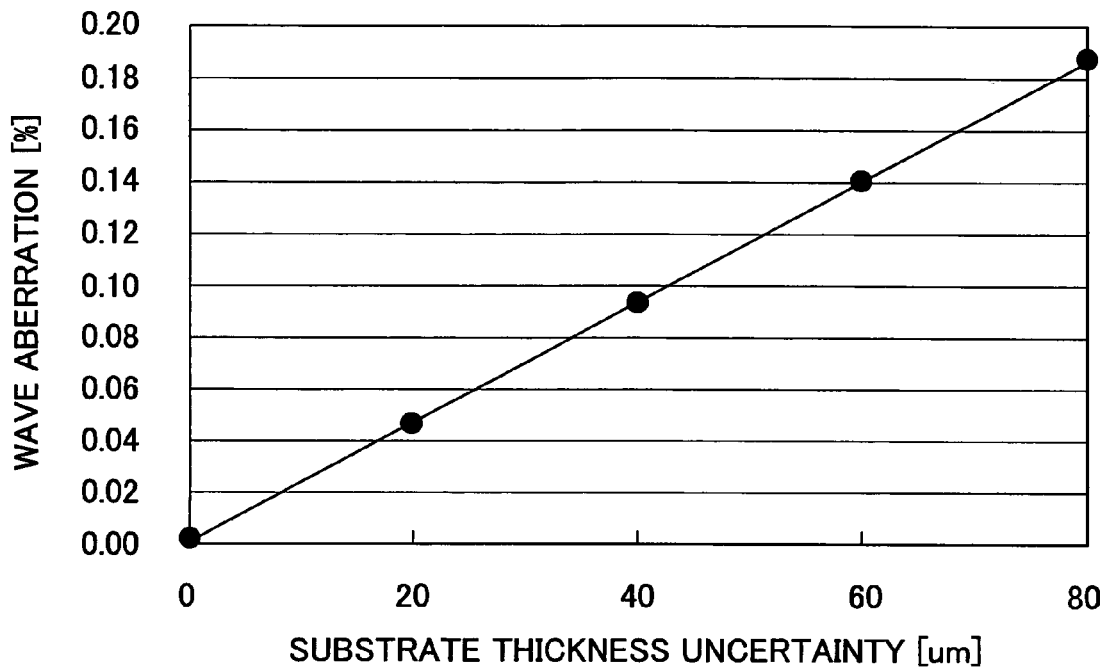
FIG. 13 shows an example of the spherical aberration caused by thickness uncertainties of the substrates of the optical recording medium 15, when no correction to aberration is made.

FIG. 13 shows an example of the spherical aberration caused by thickness uncertainties of the substrates of the optical recording medium 15, when no correction to aberration is made.

As shown in FIG. 13, the spherical aberration caused by the substrate thickness uncertainties increases in proportion to the distance from the aberration reference position S. As described above, such a behavior of the spherical aberration can be expressed by the above formula (3).

Spherical Aberration and Reproduction Signal

Figure 14:
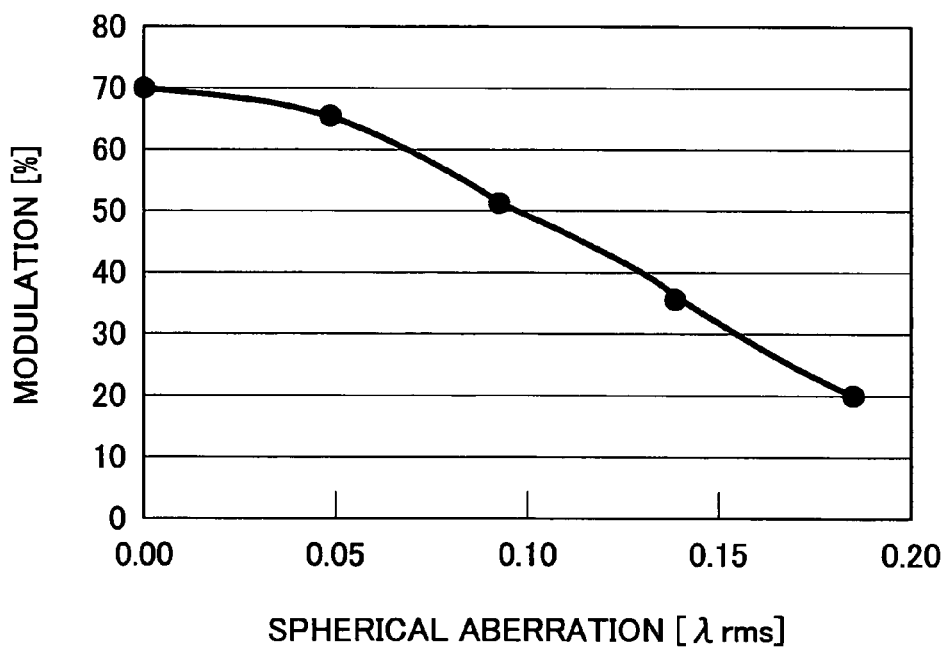
FIG. 14 shows the relation between the spherical aberration and modulation.

FIG. 14 shows the relation between the spherical aberration and modulation.

By using the results shown in FIG. 11 and FIG. 13, the relation in FIG. 14 can be obtained.

As shown in FIG. 14, when the spherical aberration $W_{40}$ satisfies $W_{40} \leq 0.07$ λrms, the modulation is greater than 60%.

Here, the quantity "modulation" is defined to be the ratio of the level of the Rf signal corresponding to the largest pit diameter to the level of the Rf signal corresponding to the smallest pit diameter.

Intermediate Layer

In the present embodiment, by using the aberration correction optical system 56, it is possible to reduce the spherical aberration $W_{40}$ to be 0.035 λrms or less.

Figure 15:
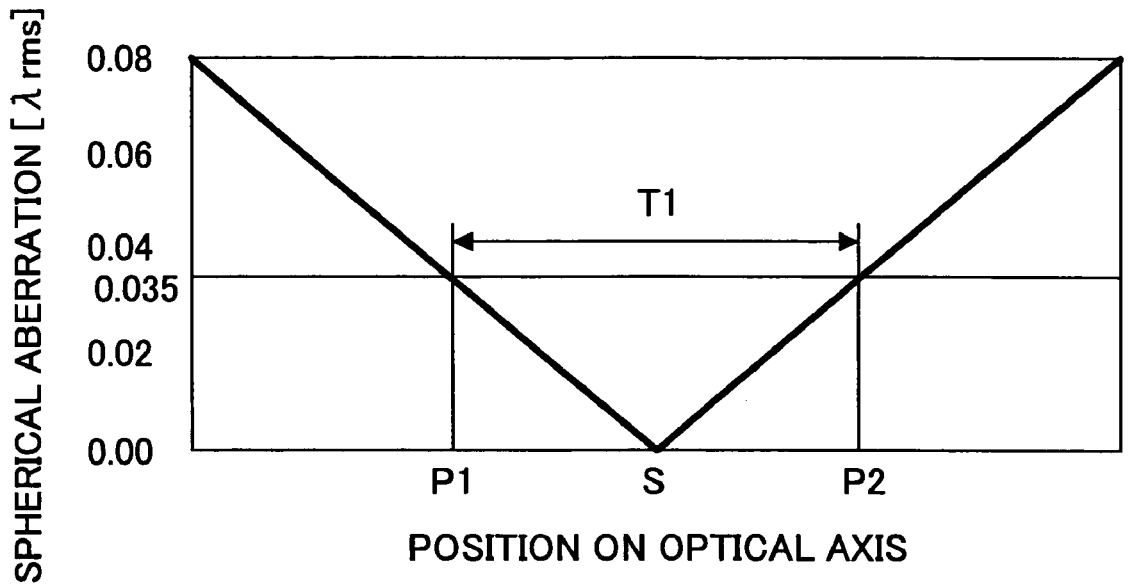
FIG. 15 explains the relation between a position on the optical axis direction and the spherical aberration.

FIG. 15 explains the relation between a position on the optical axis direction and the spherical aberration.

As shown in FIG. 15, if the positions corresponding to a spherical aberration equaling 0.035 λrms are represented by P1 and P2, the interval T1 between P1 and P2 can be expressed by the following formula (4)

$$T1 = 7.5n^3 \lambda / \{(n^2-1)NA^4\} \qquad (4)$$

If no aberration correction is made, the quantity T1 becomes the upper limit of the interval between the first recording layer M0 and the second recording layer M1. Here, it is assumed that the position P1 is on the side of the object lens 60.

Figure 16:
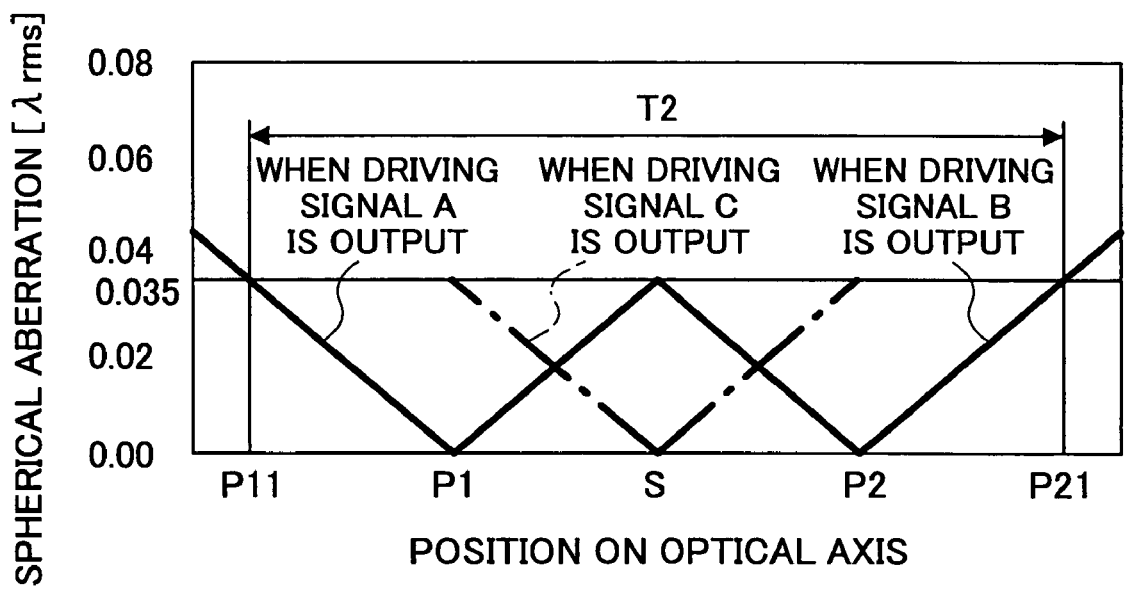
FIG. 16 further explains the relation between the position on the optical axis direction and the spherical aberration.

FIG. 16 further explains the relation between the position on the optical axis direction and the spherical aberration.

In the present embodiment, as shown in FIG. 16, a driving signal A is supplied to change intervals between lenses so that the spherical aberration at the position P1 is substantially zero, and a driving signal B is supplied to change intervals between lenses so that the spherical aberration at the position P2 is substantially zero. Assume that the driving signals A and B are obtained in advance by experiments, simulations, and theoretical calculations.

Therefore, as shown in FIG. 16, when the first recording layer M0 is selected to be the object recording layer, the driving signal A is output, whereby the spherical aberration at the position P1 is less than 0.035 λrms when the position of the first recording layer M0 is between the aberration reference position S and the position P11. Similarly, when the second recording layer M1 is selected to be the object recording layer, the driving signal B is output, whereby the spherical aberration at the position P2 is less than 0.035 λrms when the position of the second recording layer M1 is between the aberration reference position S and the position P21.

Therefore, it is sufficient that the thickness t of the intermediate layer ML be less than a quantity T2 expressed by the following formula (5)

$$T2 = 15n^3 \lambda / \{(n^2-1)NA^4\} \qquad (5)$$

In formula (5), if assigning λ=405 nm, n=1.623, NA=0.65, it is found that T2=87 µm. This value is greater than the upper limit (70 µm) of the afore-mentioned one-side two-recording-layer DVD-ROM. Therefore, it is possible to divert the existing manufacturing equipment, and it is possible to fabricate the one-side two-layer blue DVDs at low cost.

The lower limit of the thickness t of the intermediate layer ML can be defined based on at least one of a capture range of a focus error signal and an output level of the light receiver LD when influence of interlayer cross talk is small.

Summary of Optical Conditions

According to the above descriptions, preferable optical conditions of the optical recording medium 15 and the optical reproduction device 1 including the optical pickup device 23 according to the present embodiment can be summarized as following.

(1) In the optical recording medium 15 and the optical reproduction device 1 of the present embodiment, the depth H of the pits 11 having multi-levels obtained by area modulation, and the spherical aberration $W_{40}$ included in light condensed by the object lens 60 satisfy:

$$\lambda/6n \leq H < \lambda/4n \qquad (6)$$

$$W_{40} \leq 0.07 \text{ λrms} \qquad (7)$$

where λ represents the wavelength of the laser beam irradiated on the pits 11, and n represents the refractive index of the substrates L0, L1 of the optical recording medium 15.

When the formula (6) is satisfied, it is possible to attain the object of the present invention in fabrication of the pits 11.

Specifically, in the optical recording medium 15 of the present embodiment, the region including the pits 11 is divided into plural cells 13 which have the same area and each of which includes one area-modulated pit 11, and multi-level reproduction signals are generated in accordance with pit occupation in each of the cells 13. Because multi-level data are recorded in the read-only optical recording medium 15 by area modulation, but not by depth modulation as in the related art, in the process of fabricating the read-only optical recording medium 15 of the present embodiment, the developing step can be executed stably to expose the glass substrate; therefore, it is possible to provide a read-only optical recording medium 15 which is recorded with multi-level data and can be mass-produced easily.

Because the pit depth H is set in a range from $\lambda/6n$ to $\lambda/4n$, and when the pit depth H is $\lambda/6n$, the amplitude of a push-pull signal becomes maximum; when the pit depth H is $\lambda/4n$, the difference of amplitudes of reproduction signals related to different pit sizes becomes maximum, namely, when the pit depth H is $\lambda/4n$, the signal-to-noise (S/N) ratio of the reproduction signal becomes maximum, and it is possible to detect a track error signal by the push-pull method even for the read-only optical recording medium 15 formed with the pits 11, although the push-pull method is generally used for a recordable optical recording medium. Preferably, the pit depth H is set to be $\lambda/5n$, because the push-pull signal and the reproduction signal can be extracted easily when the pit depth H is near $\lambda/5n$.

In other words, when data are recorded in each of the cells 13 in accordance with pit occupation, it turns out that the sequentially-arranged pits 11 are observed by the beam spot 12 to be equivalent to continuous grooves (tracks), hence, the read-only optical recording medium 15 is compatible with the recordable optical recording medium, and for the read-only optical recording medium 15, the track error signal can be generated in the same way as in the recordable optical recording medium.

When the formula (7) is satisfied, that is, when the spherical aberration $W_{40}$ satisfies $W_{40} \leq 0.07$ $\lambda$rms, it is possible to attain the object of the present invention in combining the multi-level technique and the multi-recording-layer technique. Specifically, it is possible to maintain the modulation of multi-level signals to be greater than 60%, the modulation being a parameter related to the performance of the optical recording medium 15 and being managed appropriately in the process of manufacturing and shipment.

When the formula (7) is satisfied, that is, when the spherical aberration $W_{40}$ satisfies $W_{40} \leq 0.07$ $\lambda$rms, it is possible to maintain modulation of multi-level signals, which correspond to pits having pit depths satisfying $\lambda/6n \leq H < \lambda/4n$, to be greater than 60%, hence stable signals can be obtained.

(2) In addition to the conditions in (1), in the optical recording medium 15, the pits 11 are nearly round patterns at centers of the respective cells 13 and having different radii corresponding to modulation of areas of the pits 11. Hence, the pits 11 can be formed easily by laser exposure in the fabrication process.

Here, it is sufficient that the pits 11 are nearly round patterns but not perfectly round patterns. For example, in the fabrication process of the pits 11, the optical recording medium 15 is exposed by the laser exposure while being rotated, and the intensity of the laser beam for exposure has an elliptical distribution. Due to this, the pits 11 may be elliptical patterns deviating from circles by at most 10% in the rotation direction or in the radial direction.

(3) In addition to the conditions in (1) and (2), in the optical recording medium 15, the reproduction signals generated from the optical recording medium 15 have N levels corresponding to the pit occupation of the cells 13, where N=2, 3, 4, ..., and the pits 11 have (N−1) different diameters in response to area modulation of the pits 11. Further, the amount of light reflected from the pits 11 having (N−1) different radii substantially equally divide an interval from a value of the amount of light related to the pit 11 having the largest pit diameter to a value of the amount of light related to a cell 13 without the pit 11.

When the above condition is satisfied, that is, by changing the size of the pits 11, namely, the diameter of the pits 11, with the pit depth being arbitrary values, it is possible to obtain plural reproduction signals, and it is possible to obtain plural reproduced multi-level data.

Specifically, the pits 11 may be set to have (N−1) different diameters in response to area modulation of the pits 11 such that the amount of light reflected from the pits 11 having (N−1) different radii substantially equally divide an interval from a value of the amount of light related to the pit 11 having the largest pit diameter to a value of the amount of light related to a cell 13 without the pit 11. In this way, N-level reproduction signals are obtained.

(4) In addition to the conditions in (1), in the optical reproduction device 1 of the present embodiment, preferably, when the first recording layer M0 is selected as the object recording layer, the aberration correction unit of the optical reproduction device 1 selects an aberration correction value such that the spherical aberration is substantially a minimum at a position between the first recording layer M0 and the second recording layer M1 and t/4 away from the first recording layer M0, where, t represents an interval between the first recording layer and the second recording layer.

When the second recording layer M1 is selected as the object recording layer, the aberration correction unit selects such an aberration correction value that the spherical aberration is substantially a minimum at a position between the first recording layer M0 and the second recording layer M1 and 3t/4 away from the first recording layer M0.

More preferably, the object lens 60 is arranged such that when the incident light beam is substantially a parallel light beam, a wave aberration is substantially a minimum at a position between the first recording layer M0 and the second recording layer M1 and t/2 away from the first recording layer M0. In practice, it is sufficient that the wave aberration be less than 0.01 $\lambda$rms relative to the minimum wave aberration.

For example, the aberration correction is performed while being controlled by a microcomputer, and with the aberration correction unit 56 being driven by a not-illustrated lens driving device.

(5) In addition to the conditions in (1), preferably, the optical recording medium 15 includes the first recording layer M0 and the second recording layer M1, and the interval t between the first recording layer M0 and the second recording layer M1 satisfies the following formula (8):

$$t \leq 15n^3\lambda/\{(n^2-1)NA^4\} \tag{8}$$

where n represents an equivalent refractive index n, NA represents the numerical aperture of the object lens 60 of the optical reproduction device 1, and $\lambda$ represents the wavelength of the light from the light source.

When such an optical recording medium 15 is used in the optical reproduction device 1 satisfying the conditions in (4), because of the aberration correction functions of the optical reproduction device 1, it is possible to reduce the spherical aberration in the first recording layer M0 and the second recording layer M1.

Because it is sufficient that the interval t between the first recording layer M0 and the second recording layer M1 satisfy formula (8), the allowable range of the interval t between the first recording layer M0 and the second recording layer M1 is broader than that in the related art, and this increases the yield of fabricating the optical recording medium 15. As a result, it is possible to provide the optical recording medium 15 having large recording capacity at low cost.

Aberration Correction Optical System Control

In the optical reproduction device 1, prior to accessing the optical recording medium 15 for data reproduction, when the first recording layer M0 is selected as the object recording layer, the driving signal A is supplied to the not-illustrated lens driver, and when the second recording layer M1 is selected is selected as the object recording layer, the driving signal B is supplied to the not-illustrated lens driver. In this way, the aberration correction value is switched according to the selected object recording layer. No matter whether the selected object recording layer is the first recording layer M0 or the second recording layer M1, the spherical aberration can be reduced to be less than 0.035 λrms.

Therefore, it is possible to form a light spot having a good shape on the selected object recording layer. As a result, it is possible to precisely and stably access the optical recording medium 15 having a large recording capacity and including plural recording layers M0, M1.

Alternative to Aberration Correction Optical System

In the above, it is described that the aberration correction unit 56 is used to correct the aberration, but the present embodiment is not limited to this. For example, the position of the collimator lens 52 can be moved along the X-axis direction to correct the aberration. In this case, the aberration correction unit 56 is not needed, but it is necessary to provide a driving device for moving the collimator lens 52.

In addition, in the above, it is described that the concave lens 56a is provided on the upstream relative to the convex lens 56b, but the present embodiment is not limited to this. For example, the convex lens 56b may be provided on the upstream relative to the concave lens 56a. Here, what is important is the interval between the concave lens 56a and the convex lens 56b.

Further, in the present embodiment, instead of the aberration correction unit 56, use can be made of liquid devices in which the refractive index changes depending on the applied voltage, and electro-optical devices such as an optical device including electro-optic crystals.

Second Embodiment

In the present embodiment, the same signs and reference numbers are assigned to the same quantities and elements as those described in the previous embodiment, and the overlapping descriptions are omitted.

In the previous embodiment, it is described that the aberration reference position S is defined to be substantially at the center of the intermediate layer ML along an optical axis direction of the object lens 60, but the present invention is not limited to this configuration. For example, the aberration reference position S can be defined to be at a position corresponding to one of the first recording layer M0 and the second recording layer M1.

Figure 17:
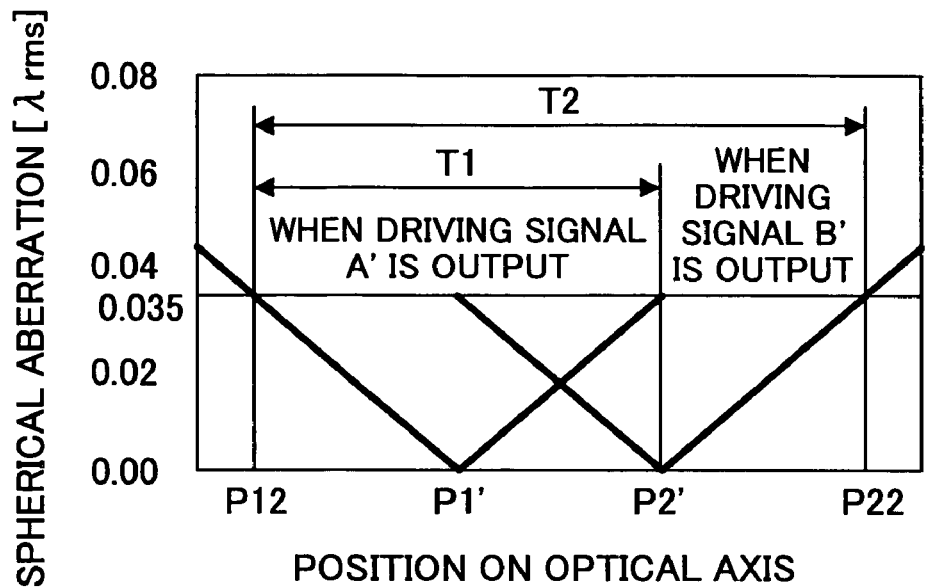
FIG. 17 shows a relation between the position on the optical axis direction and the spherical aberration according to a second embodiment of the present invention.
Figure 18:
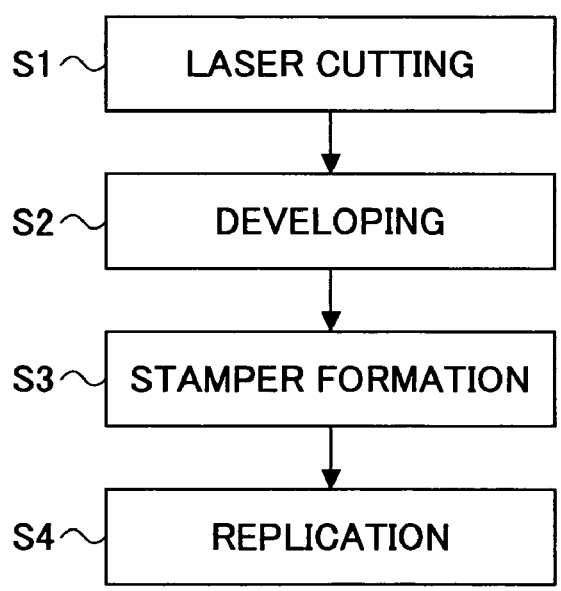
FIG. 18 is a flowchart illustrating a process for fabricating a read only optical recording medium in the related art, which is recorded with two-level signals (a high level and a low level), as signals reproduced from pits formed on a CD-type or a DVD type recording medium.
Figure 19A:
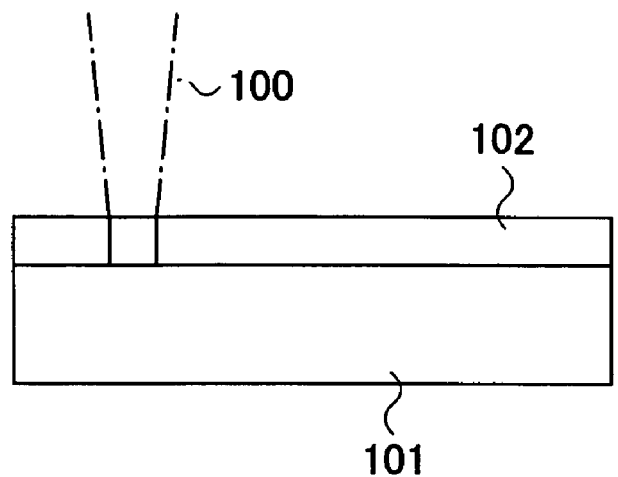
FIG. 19A through FIG. 19D are cross-sectional views of a read only optical recording medium illustrating the fabrication process of the read only optical recording medium in the related art, as shown in FIG. 18.
Figure 19B:
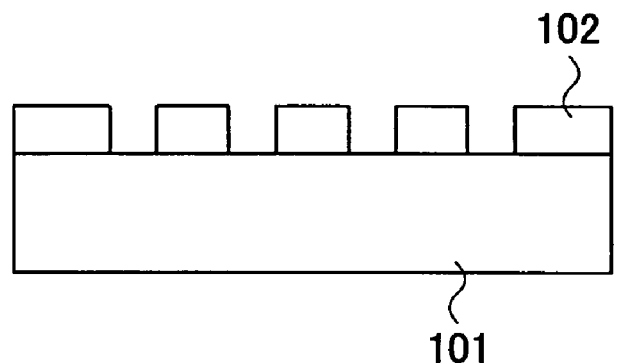
Figure 19C:
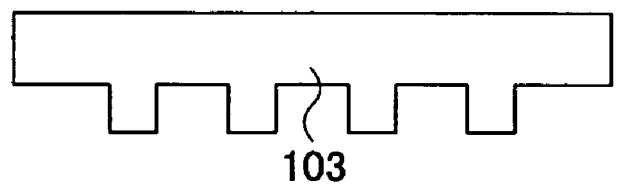
Figure 19D:
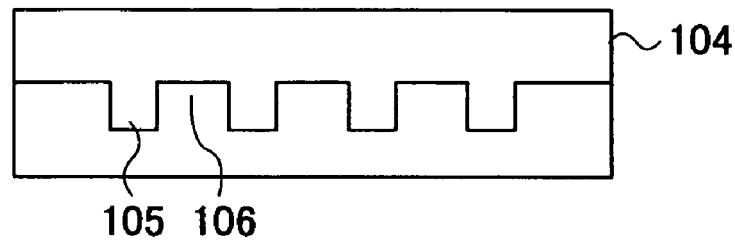

FIG. 17 shows a relation between the position on the optical axis direction and the spherical aberration according to a second embodiment of the present invention.

As shown in FIG. 17, assume the first recording layer M0 is at a position P12, and the second recording layer M1 is at a position P22. When the aberration reference position S is defined to be at the position P12 corresponding to the first recording layer M0, instead of the driving signal A in the previous embodiment, a driving signal A' is supplied so that the spherical aberration is substantially minimum at a position P1' which is between the first recording layer M0 and the second recording layer M1 and t/3 away from the first recording layer, where t represents the interval between the first recording layer M0 and the second recording layer M1. Further, instead of the driving signal B in the previous embodiment, a driving signal B' is supplied so that the spherical aberration is substantially minimum at a position P2' which is between the first recording layer M0 and the second recording layer M1 and 2t/3 away from the first recording layer.

With the above settings, if the interval t between the first recording layer M0 and the second recording layer M1 (that is, the thickness of the intermediate layer ML) is less than a quantity T3 expressed by the following formula (9), it is possible to maintain the spherical aberration to be less than 0.035 λrms.

$$T3 \leq 11n^3 \lambda / \{(n^2-1)NA^4\} \tag{9}$$

where, NA represents the numerical aperture of the object lens 60, n represents an equivalent refractive index, and λ represents the wavelength of the light from the light source.

In formula (9), if assigning λ=405 nm, n=1.623, and NA=0.65, it is found that T3=87 μm. This value is comparable to the upper limit (70 μm) of the afore-mentioned one-side two-recording-layer DVD-ROM. Therefore, it is possible to divert the existing manufacturing equipment, and it is possible to fabricate the one-side two-recording-layer blue DVDs at low cost.

In addition, the conclusion is the same when the aberration reference position S is defined to be at the position P22 corresponding to the second recording layer M1.

According to the present embodiment, in addition to the conditions in (1) in the previous embodiment, when the first recording layer M0 is selected as the object recording layer, the aberration correction unit of the optical reproduction device 1 selects an aberration correction value such that the spherical aberration is substantially a minimum at a position between the first recording layer M0 and the second recording layer M1 and t/3 away from the first recording layer M0, where t represents the interval between the first recording layer M0 and the second recording layer M1.

When the second recording layer M1 is selected as the object recording layer, the aberration correction unit selects such an aberration correction value that the spherical aberration is substantially a minimum at a position between the first recording layer M0 and the second recording layer M1 and 2t/3 away from the first recording layer M0.

More preferably, the object lens 60 is arranged such that when the incident light beam is substantially a parallel light beam, the wave aberration is substantially a minimum at a position corresponding to one of the first recording layer M0 and the second recording layer M1. In practice, it is sufficient that the wave aberration be less than 0.01 λrms relative to the minimum wave aberration.

Preferably, the optical recording medium 15 includes the first recording layer M0 and the second recording layer M1, and the interval t between the first recording layer M0 and the second recording layer M1 satisfies the following formula (10):

$$t \leq 11n^3 / \{(n^2-1)NA^4\} \tag{10}$$

where, n represents an equivalent refractive index n, NA represents the numerical aperture of the object lens 60 of the optical reproduction device 1, and λ represents the wavelength of the light from the light source.

When such an optical recording medium 15 is used in the above optical reproduction device 1, because of the aberration correction functions of the optical reproduction device 1, it is possible to reduce the spherical aberration in the first recording layer M0 and the second recording layer M1.

Because it is sufficient that the interval t between the first recording layer M0 and the second recording layer M1 satisfy formula (10), the allowable range of the interval t between the first recording layer M0 and the second recording layer M1 is broader than that in the related art, and this increases the yield of fabricating the optical recording medium 15. As a result, it is possible to provide the optical recording medium 15 having a large recording capacity at low cost.

According to the present invention, the pit depth H is set in a range from $\lambda/6n$ to $\lambda/4n$, and when the pit depth H is $\lambda/6n$, the amplitude of a push-pull signal becomes maximum, and when the pit depth H is $\lambda/4n$, the difference of amplitudes of reproduction signals related to different pit sizes becomes maximum, namely, when the pit depth H is $\lambda/4n$, the signal-to-noise (S/N) ratio of the reproduction signal becomes maximum. Due to this, it is possible to detect a track error signal by the push-pull method even for a read-only optical recording medium formed with pits, although the push-pull method is generally used for a recordable optical recording medium. In other words, when data are recorded in each cell in accordance with pit occupation, the pits which are sequentially arranged turn out to be observed by a beam spot as being equivalent to continuous grooves (tracks); hence, the read-only optical recording medium is compatible with the recordable optical recording medium, and in the read-only optical recording medium, the track error signal can be generated in the same way as in the recordable optical recording medium.

In addition, because the spherical aberration $W_{40}$ satisfies $W_{40} \leq =0.07 \lambda rms$, it is possible to maintain modulation of multi-level signals, which correspond to pits having pit depths satisfying $\lambda/6n \leq H < \lambda/4n$, to be greater than 60%; hence stable signals can be obtained.

While the present invention is described with reference to specific embodiments chosen for purpose of illustration, it should be apparent that the invention is not limited to these embodiments, but numerous modifications could be made thereto by those skilled in the art without departing from the basic concept and scope of the invention.

This patent application is based on Japanese Priority Patent Applications No. 2004-161132 filed on May 31, 2004, the entire contents of which are hereby incorporated by reference.

What is claimed is:

1. An optical reproduction method for reproducing signals based on an amount of light reflected from a plurality of pits in an optical recording medium that has a plurality of recording layers,
wherein
when a depth of each of the pits is represented by H, a wavelength of the light irradiated on the pits is represented by $\lambda$, and a refractive index of a medium substrate of the optical recording medium is represented by n, H, $\lambda$, and n satisfy:

$\lambda/6n \leq H < \lambda/4n$, and in the optical recording medium, a region where the pits are formed is divided into a plurality of cells each having the same area, and a multi-level reproduction signal is generated in response to occupation by the pits in each of the cells, and a spherical aberration $W_{40}$ included in light condensed onto the optical recording medium satisfies:

$W_{40} 0.07 \lambda rms$.

2. An optical pickup device that irradiates light to a plurality of pits in an optical recording medium having a plurality of recording layers and receives light reflected from the pits,
wherein
a depth of each of the pits represented by H, a refractive index of a medium substrate of the optical recording medium represented by n, and a wavelength $\lambda$ of the light irradiated on the pits satisfy:

$\lambda/6n \leq H < \lambda/4n$, and in the optical recording medium, a region where the pits are formed is divided into a plurality of cells each having the same area, a multi-level reproduction signal is generated in response to occupation of the pits in each of the cells, and a spherical aberration $W_{40}$ included in light condensed onto the optical recording medium satisfies:

$W_{40} \leq 0.07 \lambda rms$.

3. An optical reproduction device that irradiates light to a plurality of pits in an optical recording medium having a plurality of recording layers and reproduces signals based on an amount of light reflected from the pits, said optical reproduction device comprising:
an optical pickup device that irradiates the light to the pits and receives light reflected from the pits;
wherein
a depth of each of the pits represented by H, a refractive index of a medium substrate of the optical recording medium represented by n, and a wavelength $\lambda$ of the light irradiated on the pits satisfy:

$\lambda/6n \leq H < \lambda/4n$, and in the optical recording medium, a region where the pits are formed is divided into a plurality of cells each having the same area, a multi-level reproduction signal is generated in response to occupation of the pits in each of the cells, and a spherical aberration $W_{40}$ included in light condensed onto the optical recording medium satisfies:

$W_{40} \leq 0.07 \lambda rms$.

4. An optical recording medium comprising:
a plurality of recording layers; and
a plurality pits, signals being generated based on an amount of light reflected from the pits;
wherein
a wavelength of light irradiated onto the pits represented by $\lambda$, a depth H of each of the pits, and a refractive index n of a medium substrate of the optical recording medium satisfy:

$\lambda/6n \leq H < \lambda/4n$, and in the optical recording medium, a region where the pits are formed is divided into a plurality of cells each having the same area, a multi-level reproduction signal is generated in response to occupation by the pits in each of the cells, and a spherical aberration $W_{40}$ included in light condensed onto the optical recording medium satisfies:

$W_{40} \leq 0.07 \lambda rms$.

5. The optical recording medium as claimed in claim 4, wherein the pits are nearly round patterns at centers of the respective cells having different radii corresponding to modulation of areas of the pits.

6. The optical recording medium as claimed in claim 5, wherein
the multi-level reproduction signal has N levels, where N=2, 3, 4, . . . , and the pits have (N−1) different radii in response to the area modulation such that magnitudes of the amount of light reflected from the pits having different radii substantially equally divide an interval from a value of the amount of light related to one of the pits having the largest diameter to a value of the amount of light related to one of the cells without any of the pits.

7. The optical reproduction device as claimed in claim 3, further comprising:
a light source that emits the light;
an object lens that condenses the light from the light source onto a selected one of the recording layers;
an optical system that directs the light reflected by the selected recording layer to a light receiving position;
an optical detector that is arranged at the light receiving position to receive the reflected light; and
an aberration correction unit that, according to the selected recording layer, selects one of a plurality of aberration correction values defined in advance to correct an aberration;
wherein
the optical recording medium includes a first recording layer and a second recording layer;
when the first recording layer is selected, the aberration correction unit selects such an aberration correction value that a spherical aberration is substantially a minimum at a position between the first recording layer and the second recording layer and t/4 away from the first recording layer, where t represents an interval between the first recording layer and the second recording layer; and
when the second recording layer is selected, the aberration correction unit selects such an aberration correction value that a spherical aberration is substantially a minimum at a position between the first recording layer and the second recording layer and 3t/4 away from the first recording layer.

8. The optical reproduction device as claimed in claim 7, wherein
the object lens is arranged such that when the incident light beam is substantially a parallel light beam, a wave aberration is substantially a minimum at a position between the first recording layer and the second recording layer and t/2 away from the first recording layer.

9. The optical recording medium as claimed in claim 4, wherein
the optical recording medium includes a first recording layer and a second recording layer, and
an interval t between the first recording layer and the second recording layer, and an equivalent refractive index n of the first recording layer and the second recording layer satisfy:

$t \leq 15 n^3 \lambda / \{(n^2-1)NA^4\}$, where, NA represents a numerical aperture of an object lens for condensing the light from a light source onto a selected one of the recording layers, and $\lambda$ represents a wavelength of the light from the light source.

10. The optical reproduction device as claimed in claim 3, further comprising:
a light source that emits the light;
an object lens that condenses the light from the light source onto a selected one of the recording layers;
an optical system that directs the light reflected from the selected recording layer to a light receiving position;
an optical detector that is arranged at the light receiving position to receive the reflected light; and
an aberration correction unit that, according to the selected recording layer, selects one of a plurality of aberration correction values defined in advance to correct an aberration,
wherein
the optical recording medium includes a first recording layer and a second recording layer;
when the first recording layer is selected, the aberration correction unit selects such an aberration correction value that a spherical aberration is substantially a minimum at a position between the first recording layer and the second recording layer and t/3 away from the first recording layer, where t represents an interval between the first recording layer and the second recording layer; and
when the second recording layer is selected, the aberration correction unit selects such an aberration correction value that a spherical aberration is substantially a minimum at a position between the first recording layer and the second recording layer and 2t/3 away from the first recording layer.

11. The optical reproduction device as claimed in claim 10, wherein
the object lens is arranged such that when the incident light beam is a parallel light beam, a wave aberration is substantially a minimum at a position corresponding to one of the first recording layer and the second recording layer.

12. The optical recording medium as claimed in claim 4, wherein
the optical recording medium includes a first recording layer and a second recording layer, and
an interval t between the first recording layer and the second recording layer, and an equivalent refractive index n of the first recording layer and the second recording layer satisfy:

$t \leq 11 n^3 \lambda / \{(n^2-1)NA^4\}$, where NA represents a numerical aperture of an object lens for condensing the light from a light source onto a selected one of the recording layers, and $\lambda$ represents a wavelength of the light from the light source.

* * * * *